(12) United States Patent
Bhatia et al.

(10) Patent No.: US 8,913,241 B2
(45) Date of Patent: Dec. 16, 2014

(54) HYPERSPECTRAL IMAGING SYSTEM AND METHOD FOR IMAGING A REMOTE OBJECT

(75) Inventors: Vikram Bhatia, Painted Post, NY (US); Carl Edgar Crossland, Horseheads, NY (US); Paul G Dewa, Newark, NY (US); Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 144 days.

(21) Appl. No.: 13/555,428

(22) Filed: Jul. 23, 2012

(65) Prior Publication Data

US 2014/0022414 A1   Jan. 23, 2014

(51) Int. Cl.
*G01J 3/28* (2006.01)

(52) U.S. Cl.
USPC .......................................... 356/326; 356/328

(58) Field of Classification Search
CPC ............................................... G01J 2003/2826
See application file for complete search history.

(56) References Cited

U.S. PATENT DOCUMENTS

| | | | | |
|---|---|---|---|---|
| 6,495,818 | B1* | 12/2002 | Mao | 250/226 |
| 6,504,943 | B1* | 1/2003 | Sweatt et al. | 382/103 |
| 6,859,275 | B2 | 2/2005 | Fateley et al. | |
| 7,106,435 | B2 | 9/2006 | Nelson | |
| 7,382,498 | B1* | 6/2008 | Cook | 356/328 |
| 7,652,765 | B1* | 1/2010 | Geshwind et al. | 356/330 |
| 8,599,374 | B1* | 12/2013 | Comstock et al. | 356/310 |
| 2004/0195510 | A1 | 10/2004 | Carr et al. | |
| 2004/0257563 | A1* | 12/2004 | Miller et al. | 356/328 |
| 2005/0046921 | A1* | 3/2005 | Govil et al. | 359/291 |
| 2005/0243312 | A1 | 11/2005 | Geshwind et al. | |
| 2006/0092414 | A1 | 5/2006 | Geshwind et al. | |
| 2010/0328659 | A1* | 12/2010 | Bodkin | 356/326 |
| 2012/0050533 | A1* | 3/2012 | Dewa et al. | 348/143 |
| 2012/0105846 | A1 | 5/2012 | Funayama et al. | |
| 2012/0113506 | A1* | 5/2012 | Gmitro et al. | 359/385 |

FOREIGN PATENT DOCUMENTS

| | | |
|---|---|---|
| FR | 2918467 | 1/2009 |
| GB | 1129685 | 10/1968 |
| JP | 2001-296180 | 10/2001 |
| WO | 02/075292 | 9/2002 |
| WO | 2005/088264 | 9/2005 |

OTHER PUBLICATIONS

Machine Translation of JP2001-296180.
PCT/US2013/050620 Search Report.
Possible Prior Art—http://www.ti.com/solution/dlp_hyperspectral_imaging.

* cited by examiner

*Primary Examiner* — Kara E Geisel
*Assistant Examiner* — Hina F Ayub
(74) *Attorney, Agent, or Firm* — Kevin L. Bray; Timothy M Schaeberle

(57) ABSTRACT

A hyperspectral imaging system and method are described herein for providing a hyperspectral image of an area of a remote object (e.g., scene of interest). The hyperspectral imaging system includes at least one optic, a scannable slit mechanism, a spectrometer, a two-dimensional image sensor, and a controller. The scannable slit mechanism can be a micro-electromechanical system spatial light modulator (MEMS SLM), a diffractive Micro-Opto-Electro-Mechanical Systems (MOEMS) spatial light modulator (SLM), a digital light processing (DLP) system, a liquid crystal display, a rotating drum with at least one slit formed therein, or a rotating disk with at least one slit formed therein.

17 Claims, 27 Drawing Sheets

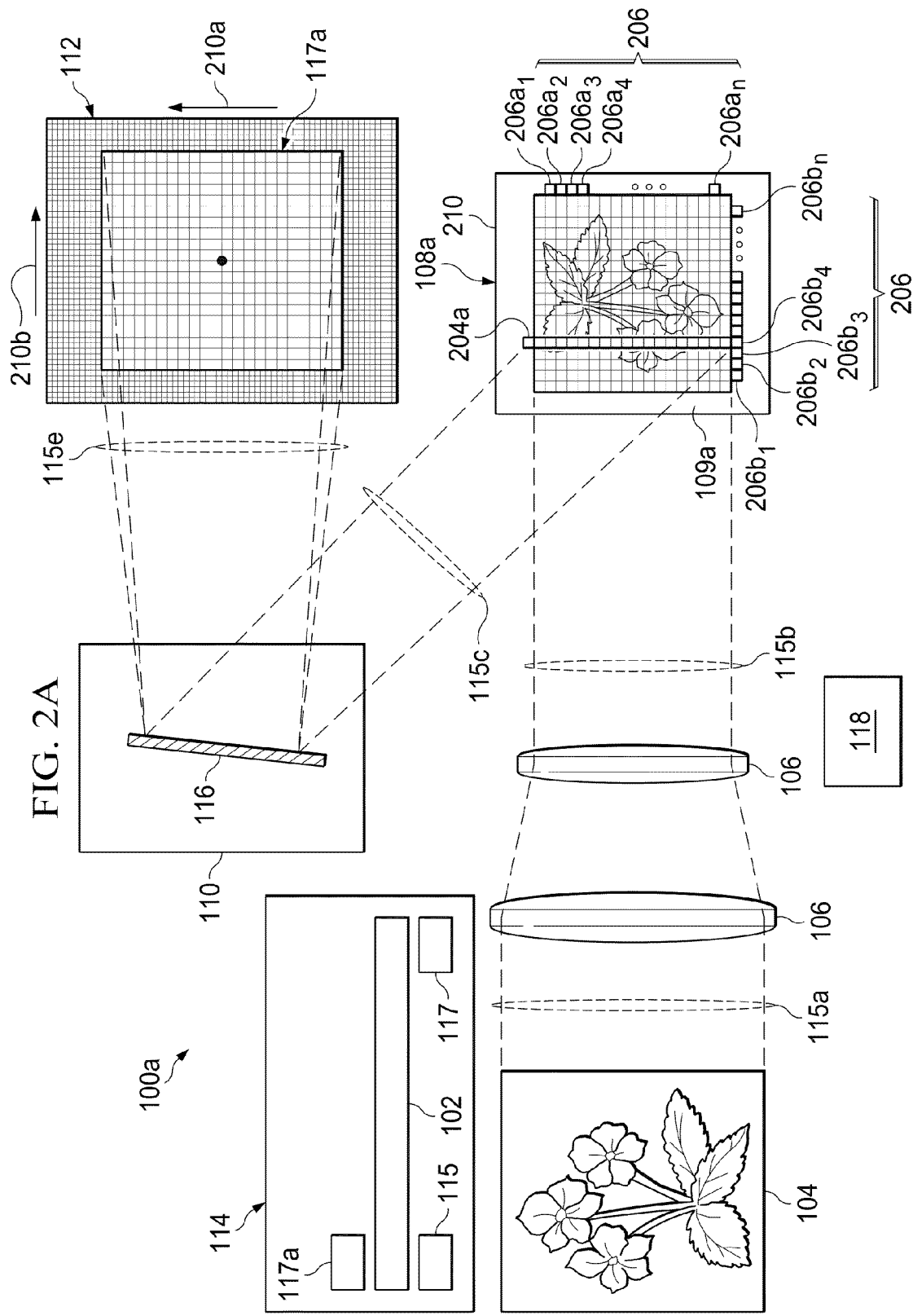

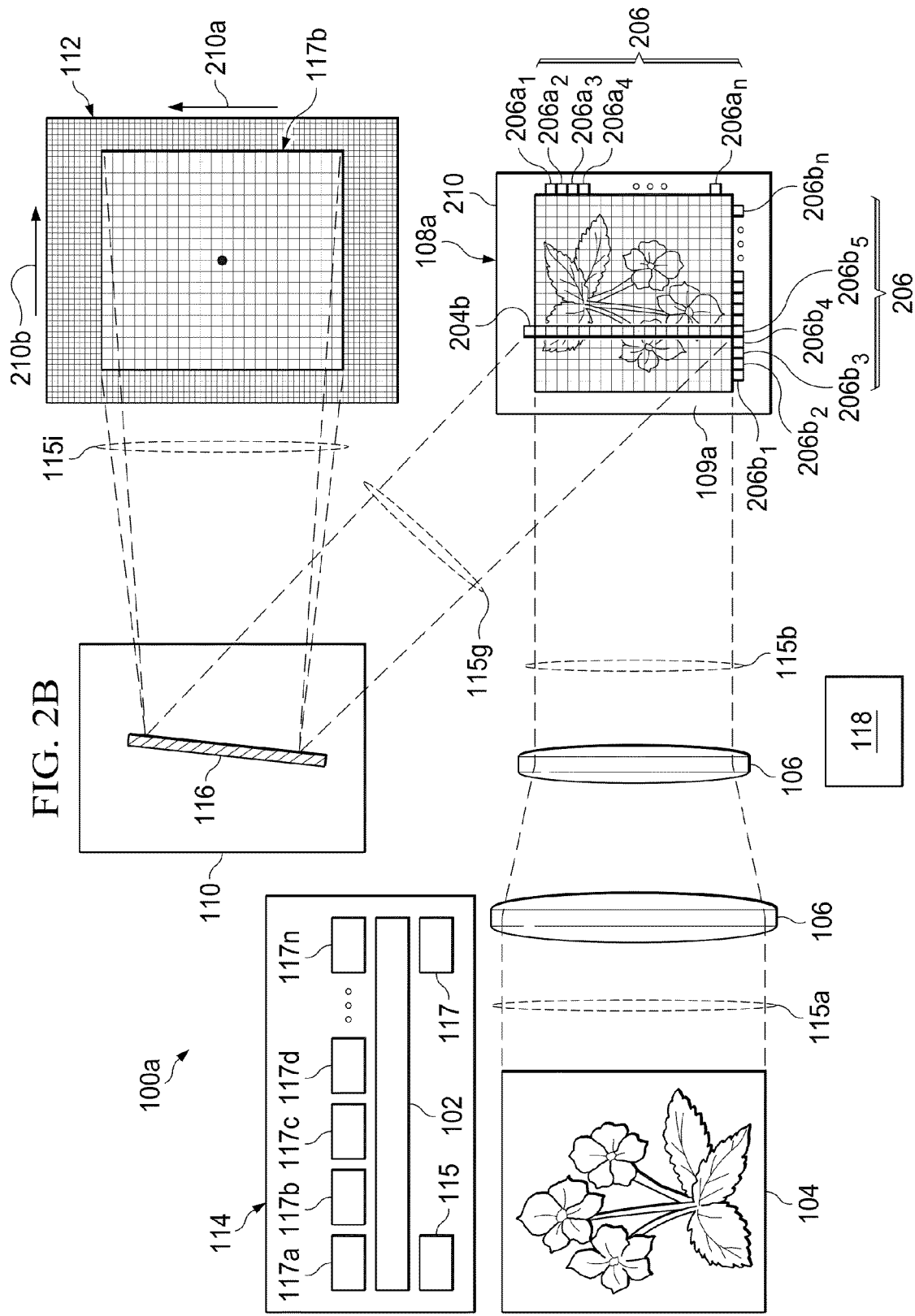

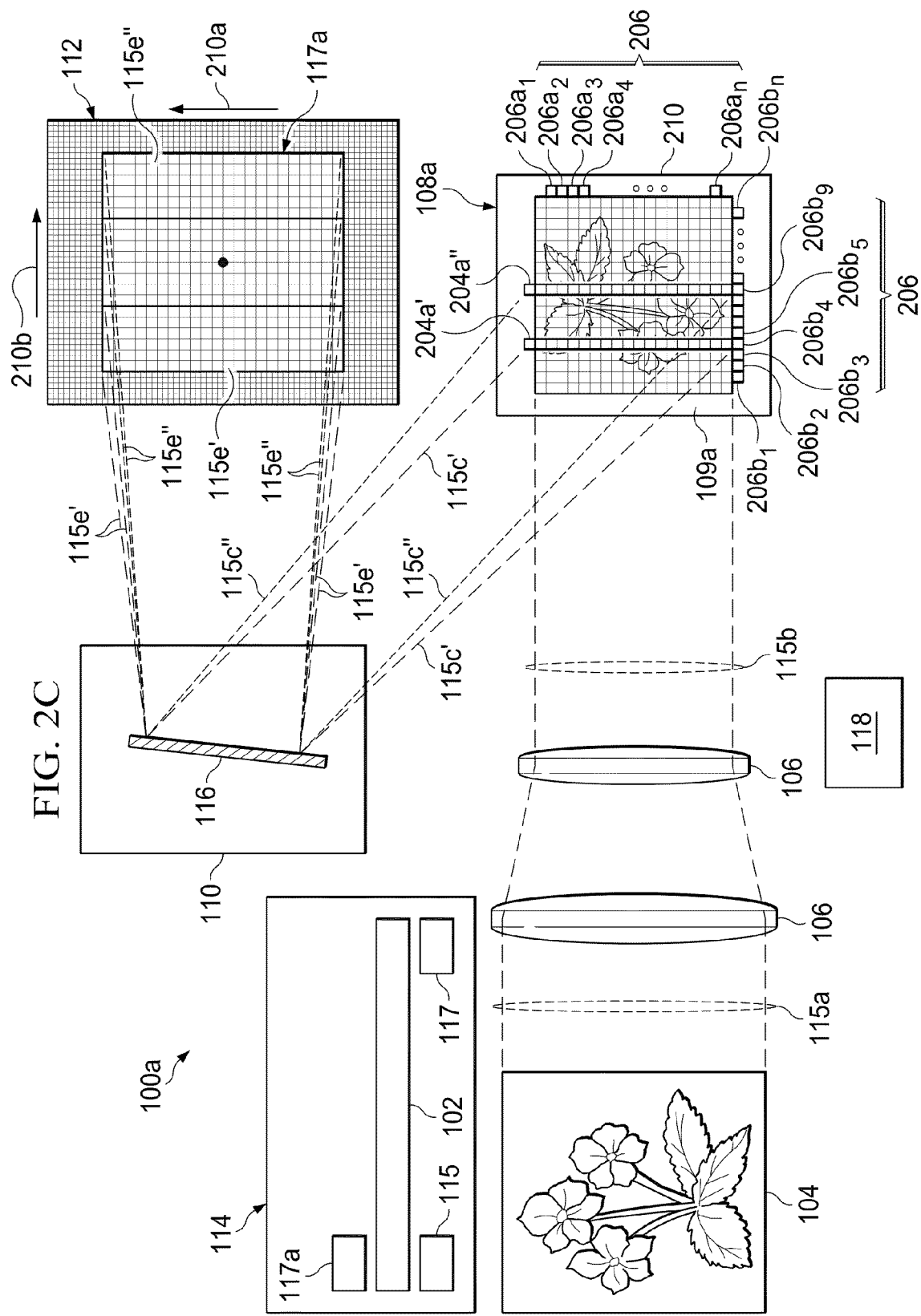

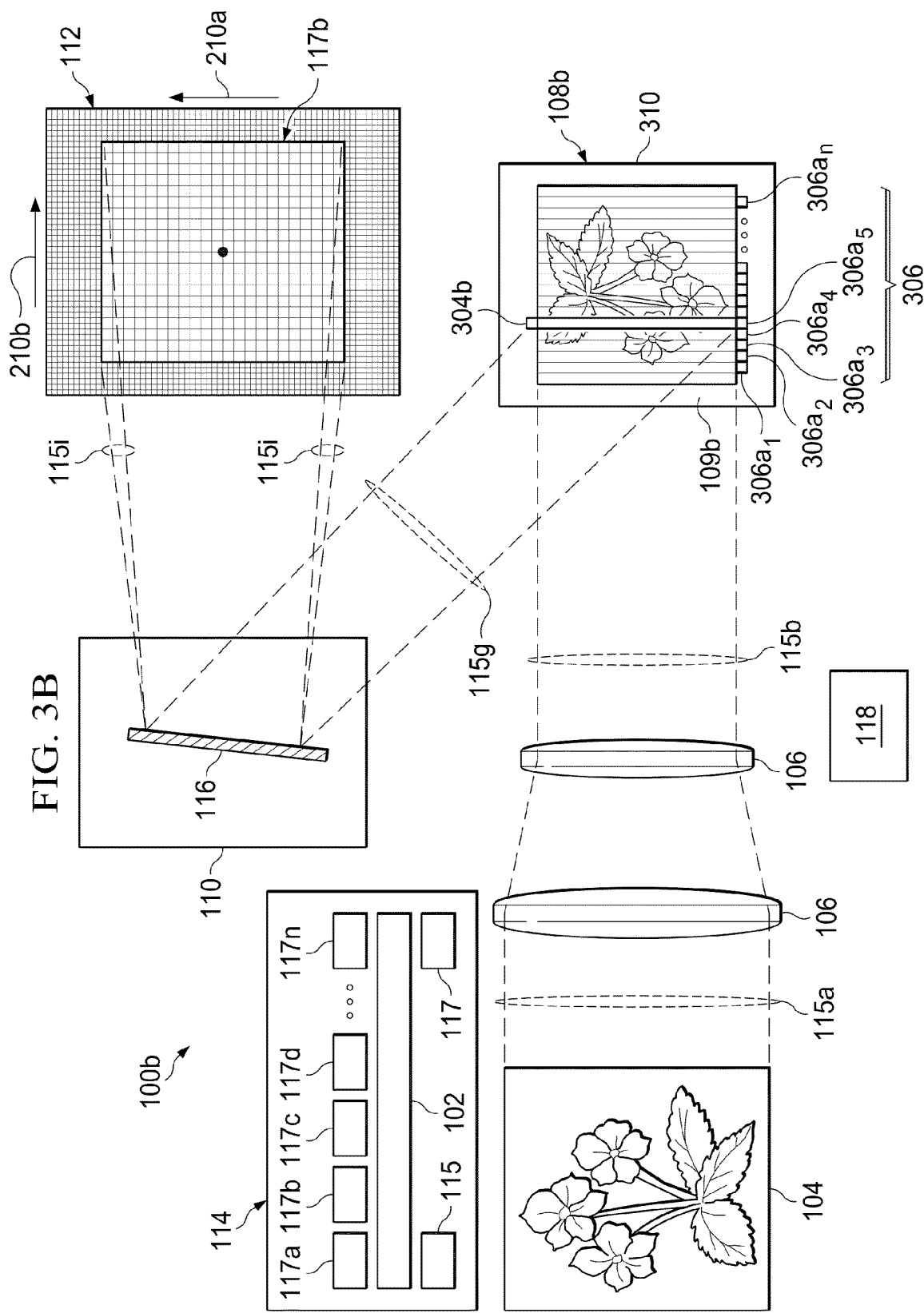

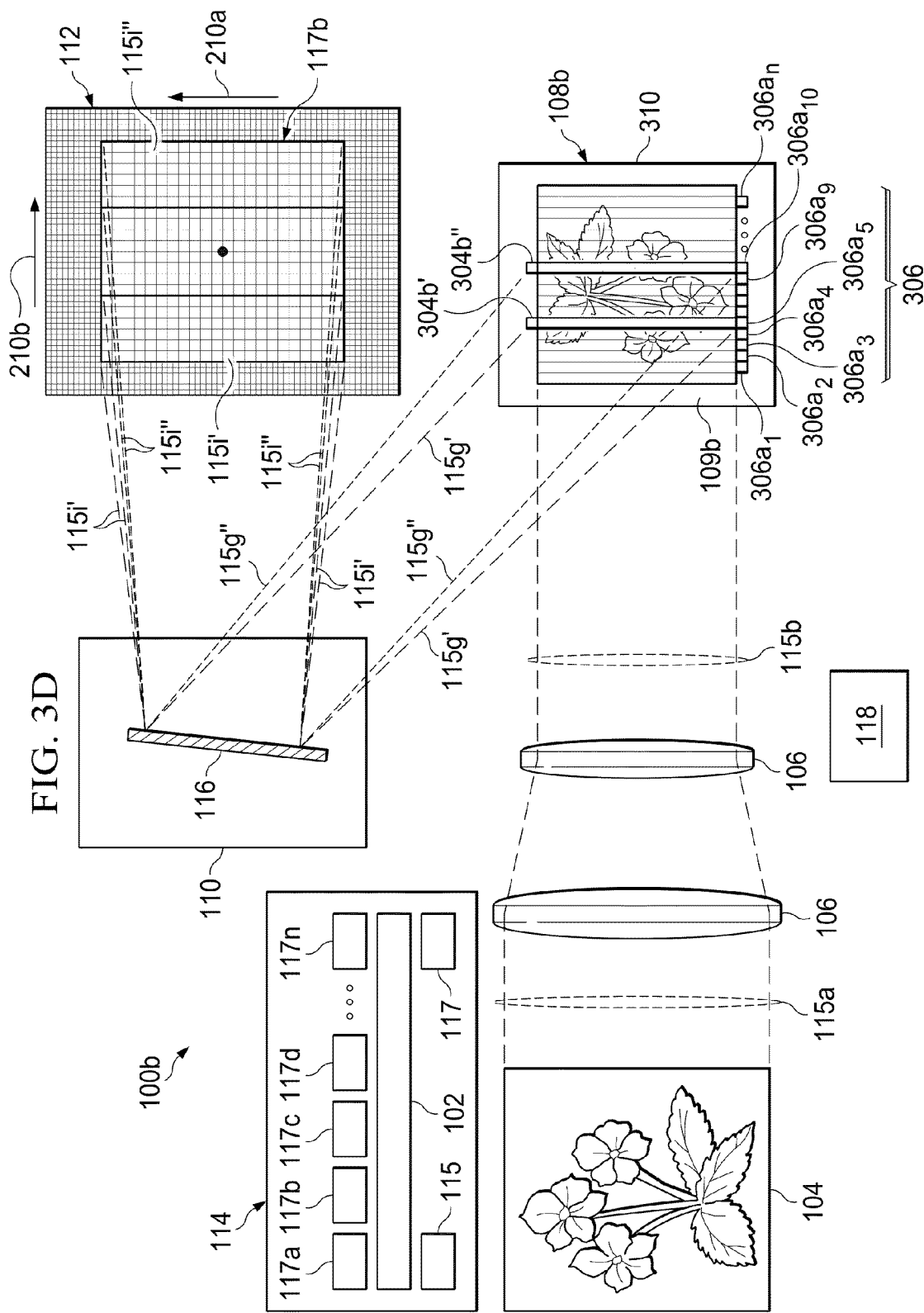

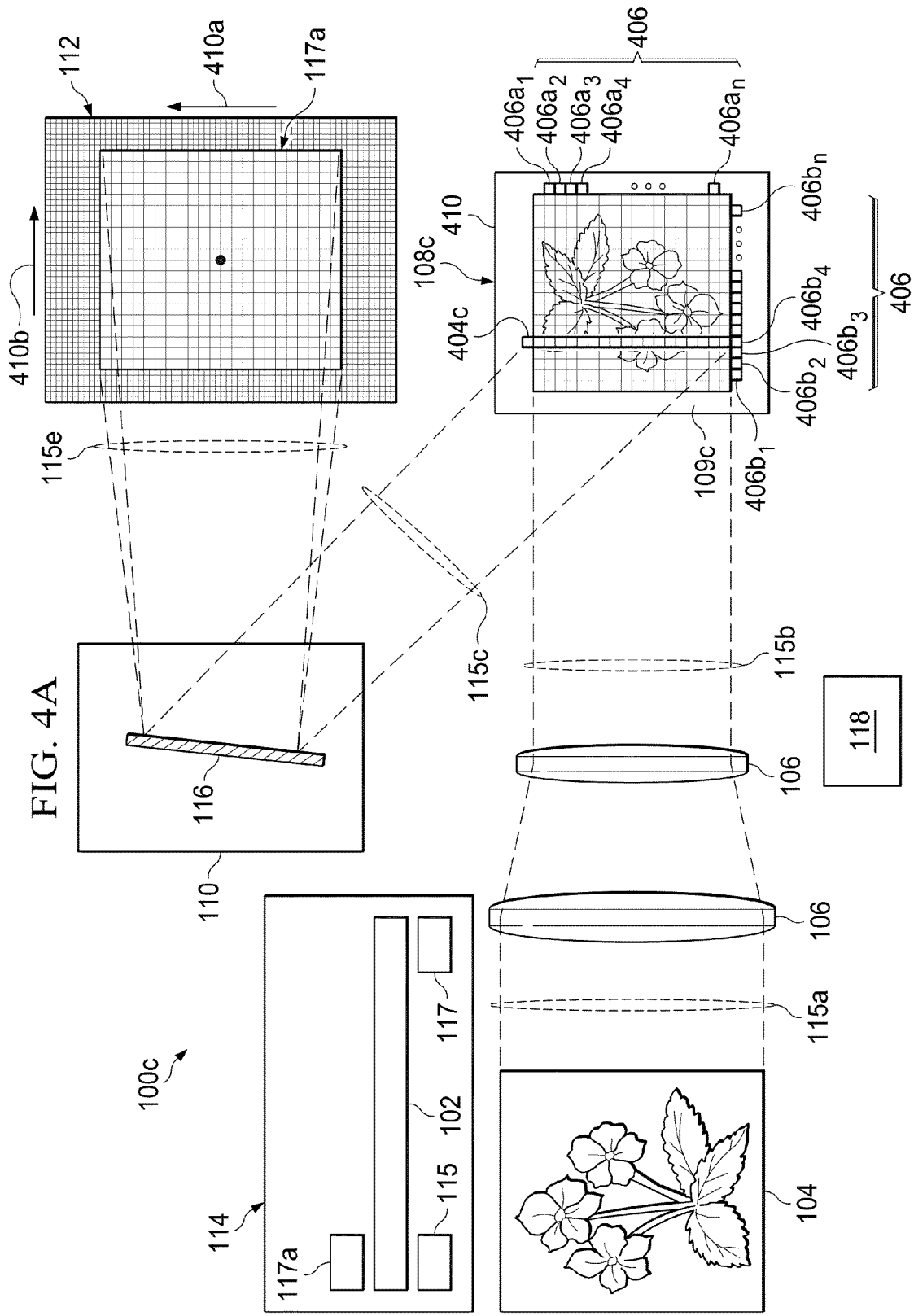

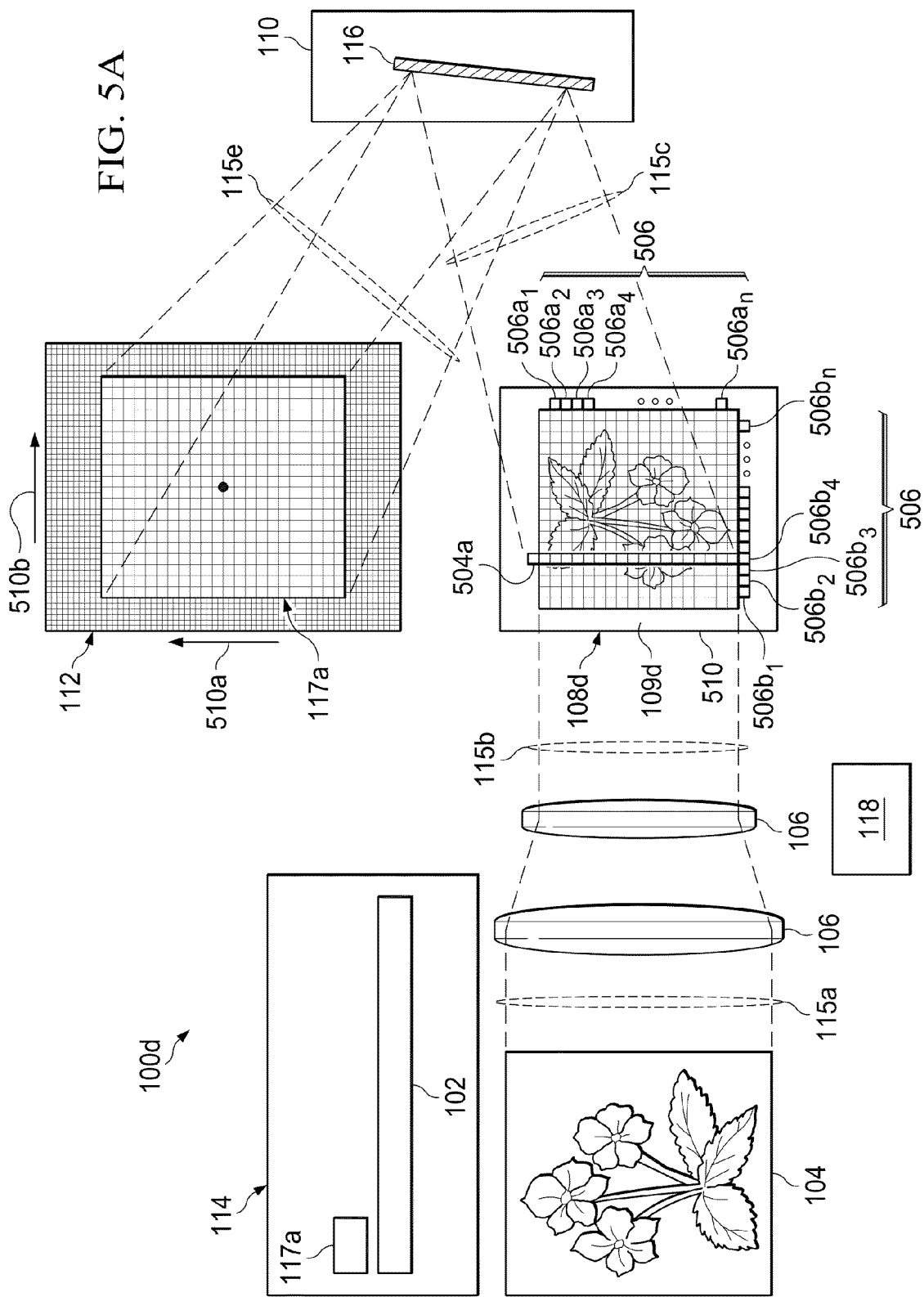

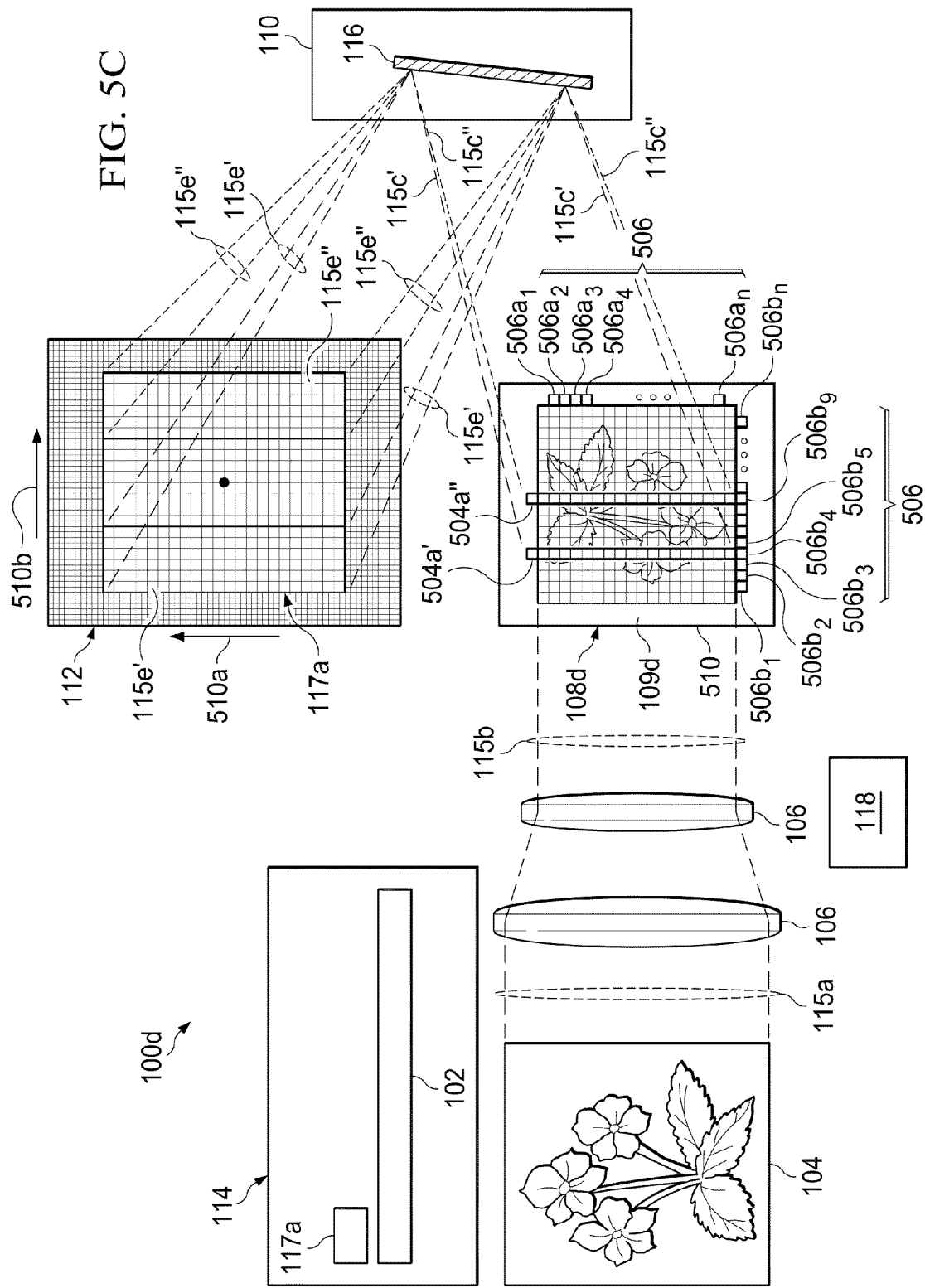

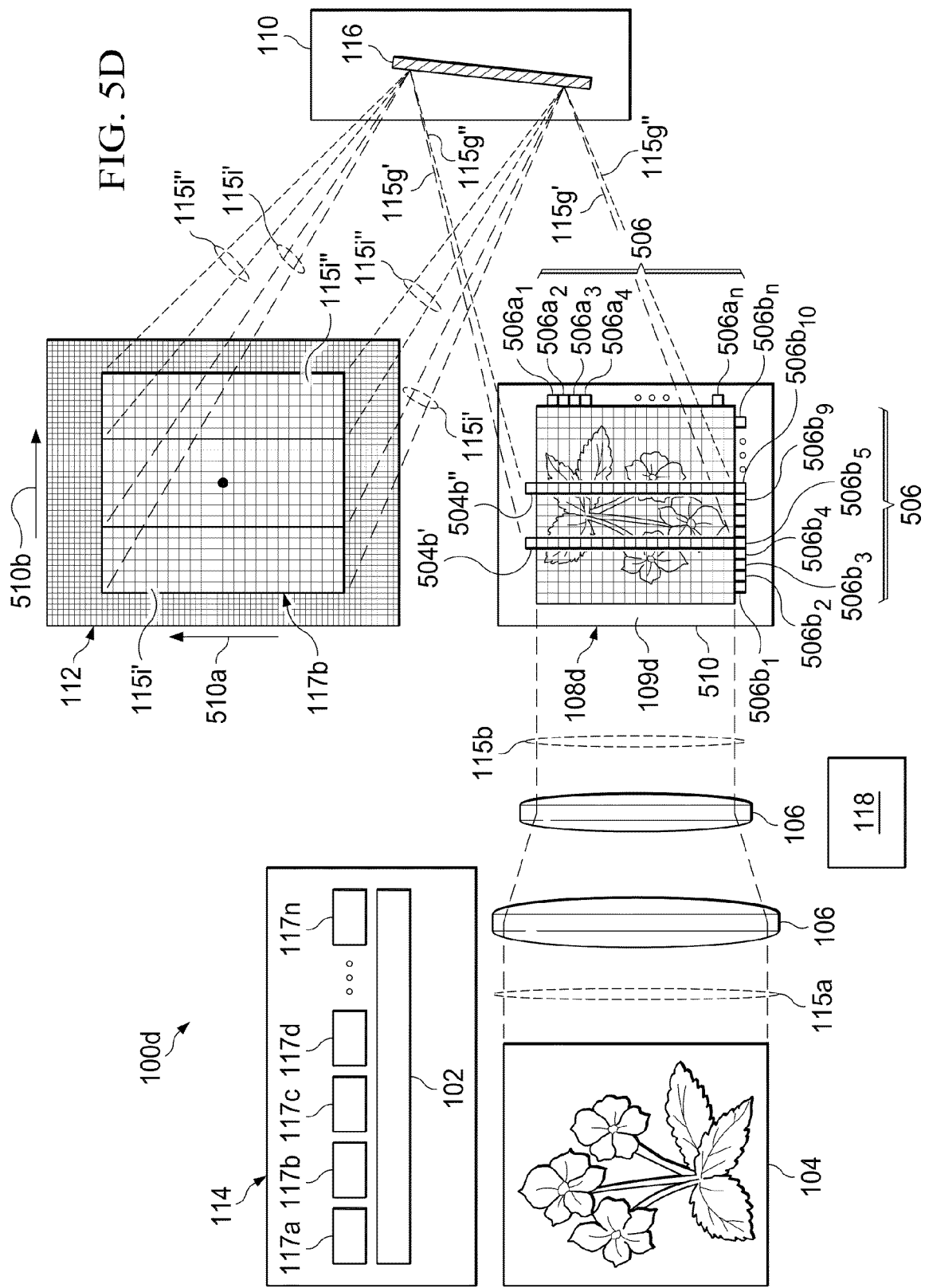

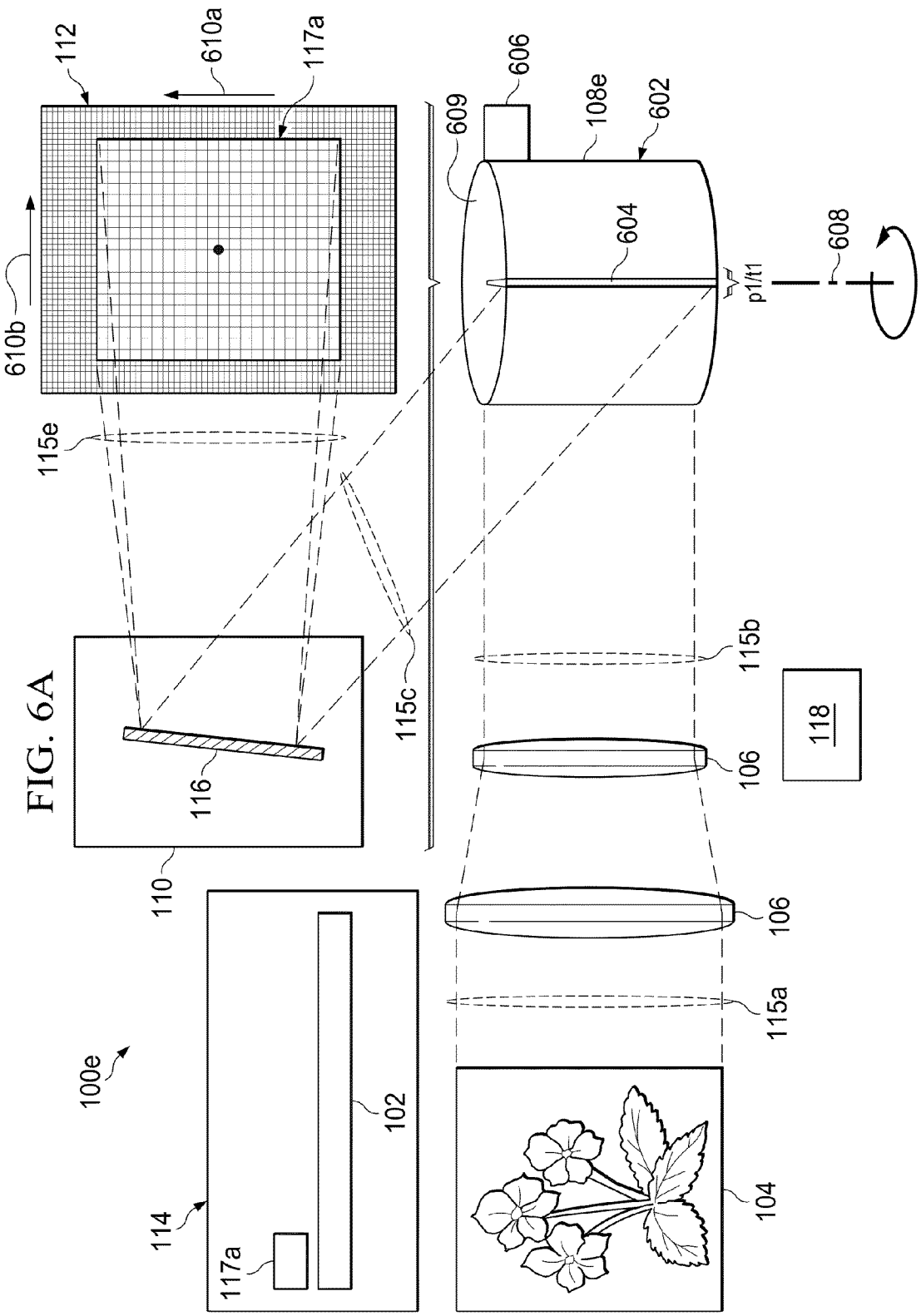

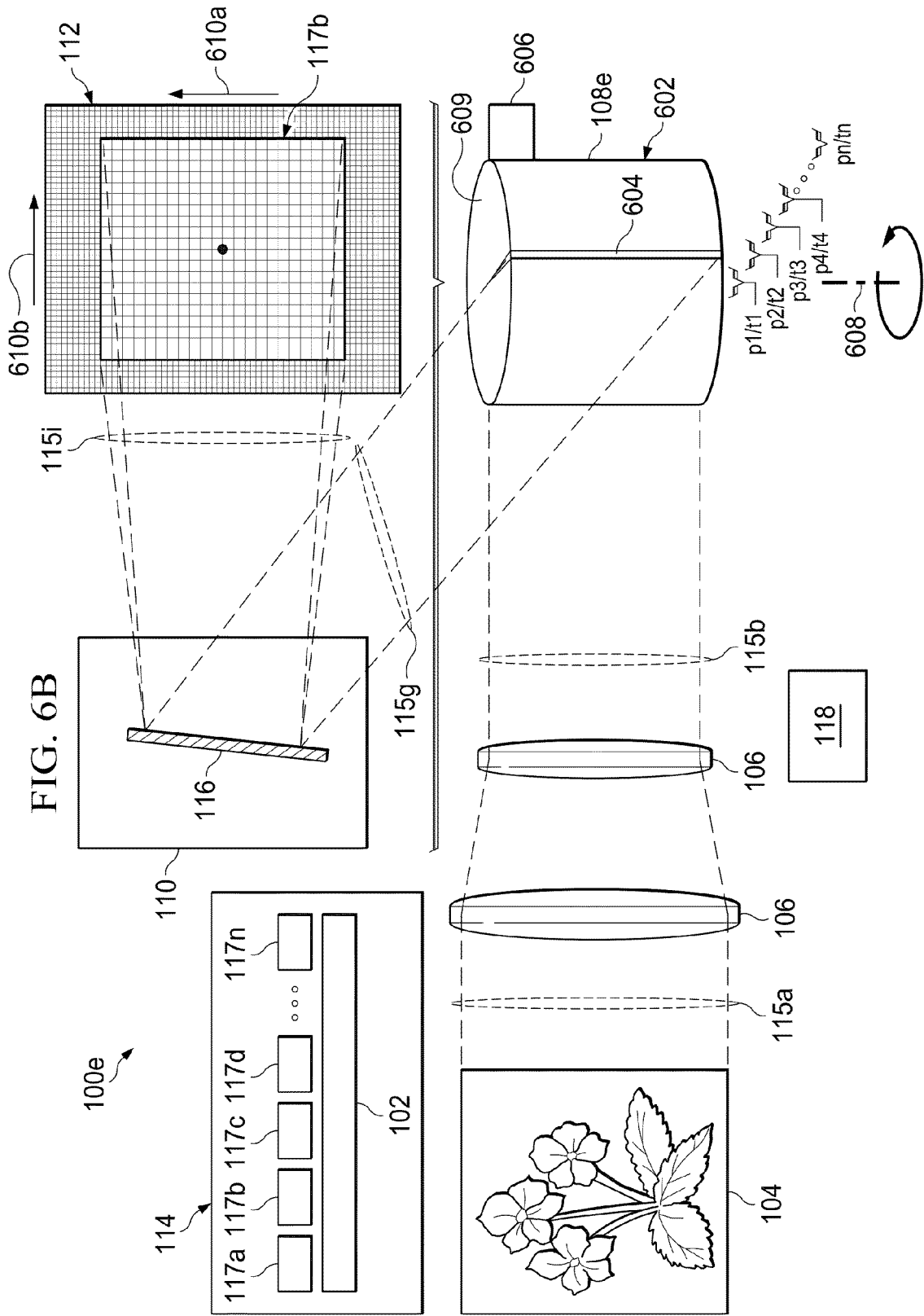

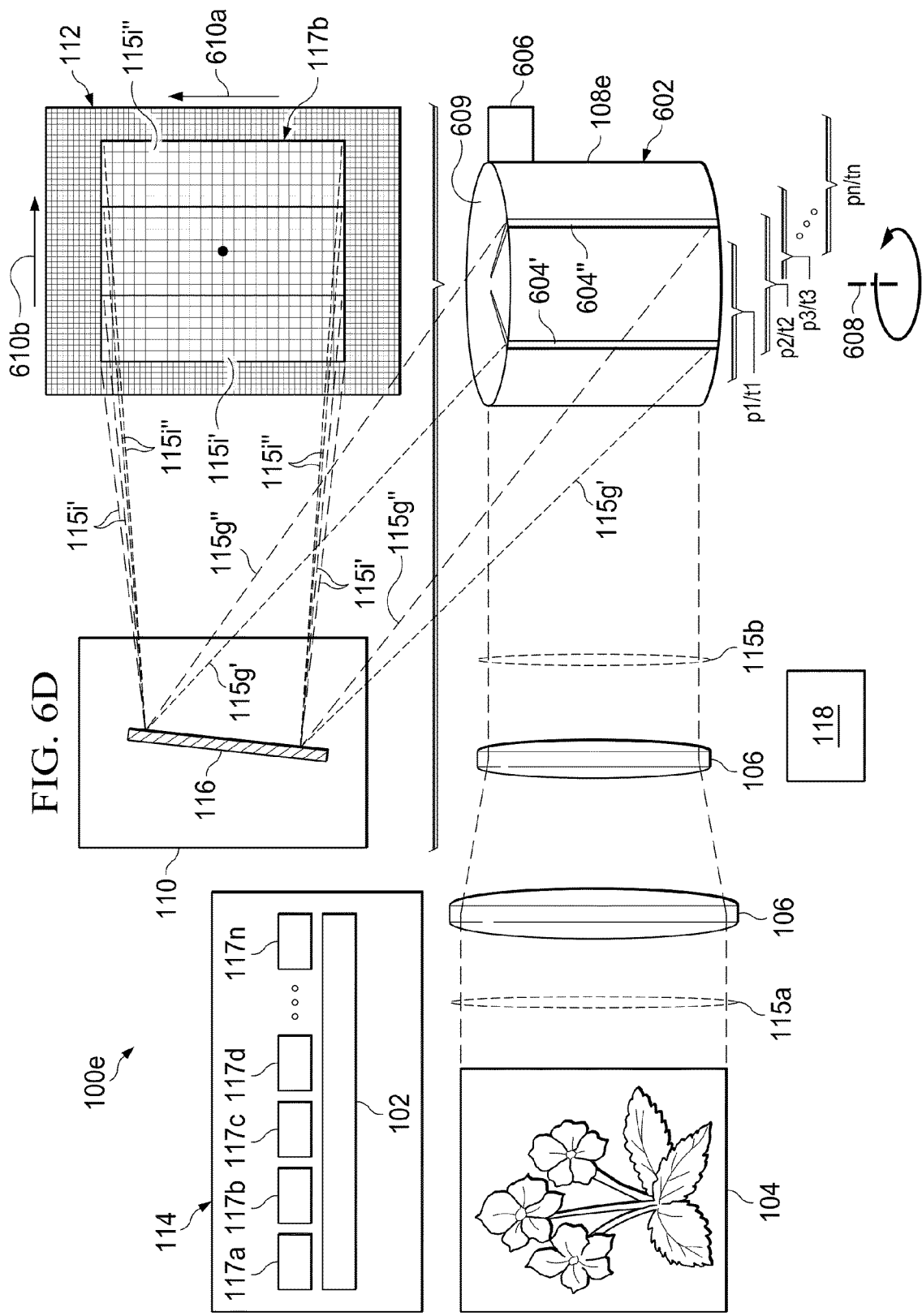

HYPERSPECTRAL IMAGING SYSTEM AND METHOD FOR IMAGING A REMOTE OBJECT

TECHNICAL FIELD

The present disclosure relates to a hyperspectral imaging system and method for providing a hyperspectral image of an area of a remote object (e.g., scene of interest). The hyperspectral imaging system includes at least one optic, a scannable slit mechanism, a spectrometer, a two-dimensional image sensor, and a controller. The scannable slit mechanism can be a micro-electromechanical system spatial light modulator (MEMS SLM), a diffractive Micro-Opto-Electro-Mechanical Systems (MOEMS) spatial light modulator (SLM), a digital light processing (DLP) system, a liquid crystal display, a rotating drum with at least one slit formed therein, or a rotating disk with at least one slit formed therein.

BACKGROUND

The traditional hyperspectral imaging system typically has an imaging lens which forms an image of a remote object of interest onto a fixed slit which is followed by a spectrometer. The spectrometer may be configured as an Offner spectrometer, a Dyson spectrometer or any one of several other types of spectrometers. However, the hyperspectrometer architecture with the fixed slit is limited to forming a hyperspectrum of a single line of light from the remote object. In addition, the hyperspectrometer architecture with the fixed slit is limited to filling only those pixels on the image sensor that correspond to the spectra of the fixed slit. There are currently two known techniques for extending the hyperspectrum image from a single line of light from the remote object to a two dimensional area of the remote object. The first known technique involves moving the entire hyperspectral imaging system in a direction perpendicular to the fixed slit and synchronizing the image taking with that motion to obtain the hyperspectral image of an area of the remote object. This technique is often called the "push broom" method. The second known technique involves placing a rotating mirror in front of the imaging lens and then synchronizing the image taking with the rotation of the mirror to obtain the hyperspectral image of an area of the remote object. Although the traditional hyperspectral imaging system and these known techniques for obtaining the hyperspectral image of an area of the remote object may work well in some applications it is still desirable to develop new hyperspectral imaging systems that can be used to obtain the hyperspectral image of an area of the remote object.

SUMMARY

A hyperspectral imaging system and a method for providing a hyperspectral image of an area of a remote object been described in the independent claims of the present application. Advantageous embodiments of hyperspectral imaging system and the method for providing a hyperspectral image of an area of a remote object have been described in the dependent claims.

In one aspect, the present disclosure provides a hyperspectral imaging system for providing a hyperspectral image of an area of a remote object. The hyperspectral imaging system comprises: (a) at least one optic configured to receive light associated with the remote object; (b) a scannable slit mechanism comprising a surface configured to receive the light from the at least one optic, and the surface further positioned at an image plane of the at least one optic; (c) the scannable slit mechanism is configured to activate at a first time at least one first slit located in at least one position on the surface, where the activated at least one first slit provides at least one first line of the light; (d) a spectrometer comprising at least a diffraction grating configured to receive the at least one first line of the light and provide at least one first diffracted light; (e) a two-dimensional image sensor configured to receive the at least one first diffracted light and provide a two dimensional image of the at least one first diffracted light; (f) the scannable slit mechanism is further configured at a second time to deactivate the at least one first slit and activate at least one second slit located in at least one different position on the surface when compared to the at least one position of the deactivated at least one first slit, where the activated at least one second slit provides at least one second line of the light; (g) the diffraction grating is configured to receive the at least one second line of the light and provide at least one second diffracted light; and (h) the two-dimensional image sensor is configured to receive the at least one second diffracted light and provide a two dimensional image of the at least one second diffracted light. For instance, the scannable slit mechanism can be a micro-electromechanical system spatial light modulator (MEMS SLM), a diffractive Micro-Opto-Electro-Mechanical Systems (MOEMS) spatial light modulator (SLM), a digital light processing (DLP) system, a liquid crystal display, a rotating drum with at least one slit formed therein, or a rotating disk with at least one slit formed therein.

In another aspect, the present disclosure provides a method for providing a hyperspectral image of an area of a remote object. The method comprises the step of providing a hyperspectral imaging system comprising: (i) at least one optic configured to receive light associated with the remote object; (ii) a scannable slit mechanism comprising a surface configured to receive the light from the at least one optic, and the surface further positioned at an image plane of the at least one optic; (iii) the scannable slit mechanism is configured to activate at a first time at least one first slit located in at least one position on the surface, where the activated at least one first slit provides at least one first line of the light; (iv) a spectrometer comprising at least a diffraction grating configured to receive the at least one first line of the light and provide at least one first diffracted light; (v) a two-dimensional image sensor configured to receive the at least one first diffracted light and provide a two dimensional image of the at least one first diffracted light; (vi) the scannable slit mechanism is further configured at a second time to deactivate the at least one first slit and activate at least one second slit located in at least one different position on the surface when compared to the at least one position of the deactivated at least one first slit, where the activated at least one second slit provides at least one second line of the light; (vii) the diffraction grating is configured to receive the at least one second line of the light and provide at least one second diffracted light; and (viii) the two-dimensional image sensor is configured to receive the at least one second diffracted light and provide a two dimensional image of the at least one second diffracted light. For instance, the scannable slit mechanism can be a micro-electromechanical system spatial light modulator (MEMS SLM), a diffractive Micro-Opto-Electro-Mechanical Systems (MOEMS) spatial light modulator (SLM), a digital light processing (DLP) system, a liquid crystal display, a rotating drum with at least one slit formed therein, or a rotating disk with at least one slit formed therein.

Additional aspects of the disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein:

FIGS. 2A-2D are several diagrams illustrating the hyperspectral imaging system shown in FIG. 1 where the scannable slit mechanism incorporated therein is a micro-electromechanical system spatial light modulator (MEMS SLM) in accordance with a first embodiment of the present invention;

FIGS. 3A-3D are several diagrams illustrating the hyperspectral imaging system shown in FIG. 1 where the scannable slit mechanism incorporated therein is a diffractive Micro-Opto-Electro-Mechanical Systems (MOEMS) spatial light modulator (SLM) (also known as a Grating Light Valve™) in accordance with a second embodiment of the present invention;

FIGS. 4A-4D are several diagrams illustrating the hyperspectral imaging system shown in FIG. 1 where the scannable slit mechanism incorporated therein is a digital light processing (DLP) system in accordance with a third embodiment of the present invention;

FIGS. 5A-5D are several diagrams illustrating the hyperspectral imaging system shown in FIG. 1 where the scannable slit mechanism incorporated therein is a Liquid Crystal Display (LCD) in accordance with a fourth embodiment of the present invention;

FIGS. 6A-6D are several diagrams illustrating the hyperspectral imaging system shown in FIG. 1 where the scannable slit mechanism incorporated therein is a drum with at least one slit formed therein and an actuator that rotates the drum in accordance with a fifth embodiment of the present invention;

DETAILED DESCRIPTION

Figure 1:
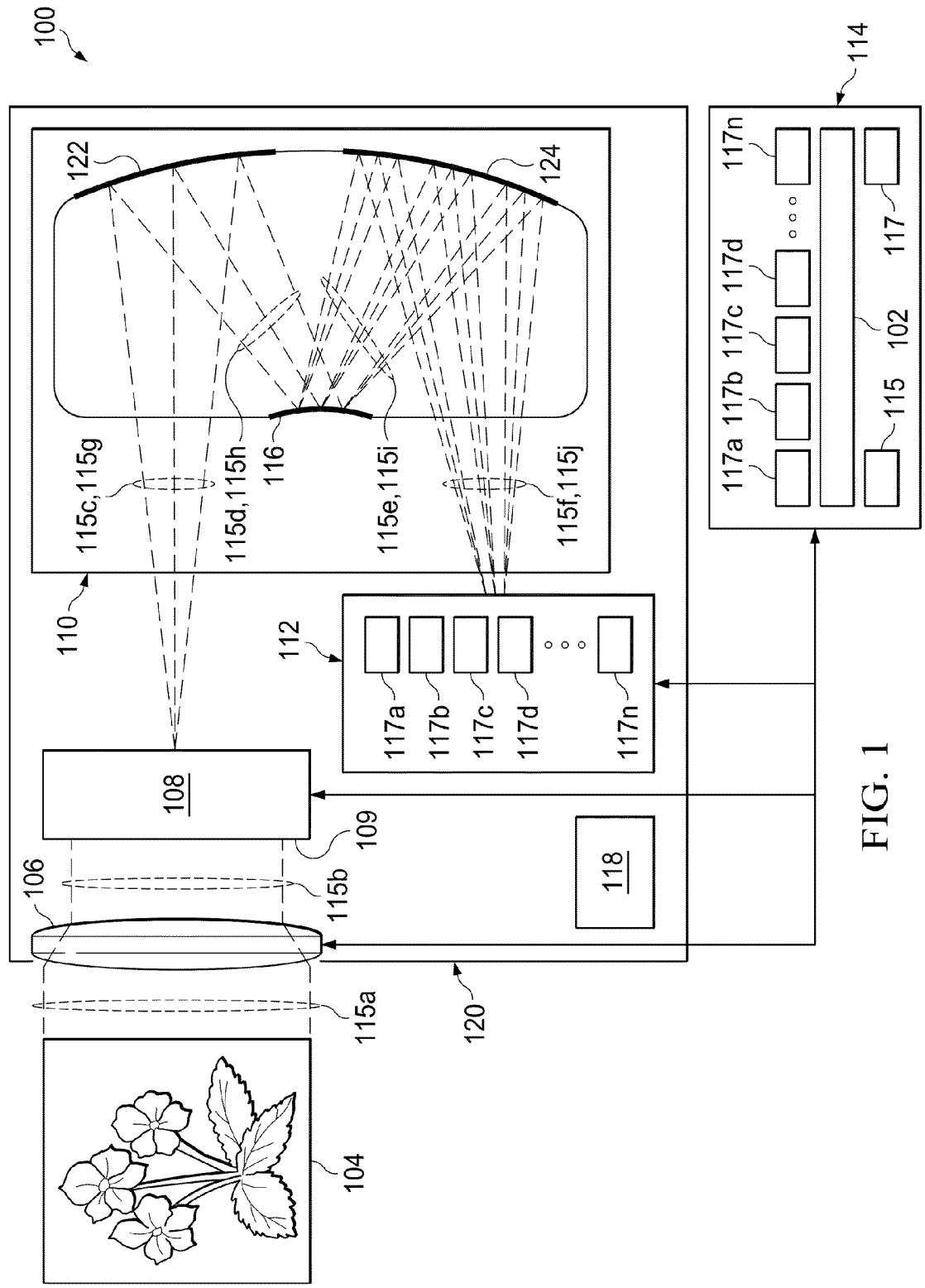
FIG. 1 is a diagram illustrating the basic components of an exemplary hyperspectral imaging system configured for providing a hyperspectral image of an area of a remote object in accordance with an embodiment of the present invention.

Referring to FIG. 1, there is a diagram illustrating the basic components of an exemplary hyperspectral imaging system 100 configured for providing a hyperspectral image 102 of an area of a remote object 104 in accordance with an embodiment of the present invention. The hyperspectral imaging system 100 includes one or more optics 106, a scannable slit mechanism 108, a spectrometer 110, a two-dimensional image sensor 112, and a controller 114. The spectrometer 110 may be an Offner spectrometer (shown), a Dyson spectrometer or any one of other well known spectrometers so long as it incorporates a diffraction grating 116. The hyperspectral imaging system 100 may also include a light dump 118 which receives the light from the scannable slit mechanism 108 which is not directed into the spectrometer 110. Furthermore, the hyperspectral imaging system 100 may include a housing 120 which encloses and supports the optics 106, the scannable slit mechanism 108, the spectrometer 110, the two-dimensional image sensor 112, and the light dump 118. In this example, the controller 114 is shown as being positioned outside of the housing 120 but is still operatively coupled to the optics 106, the scannable slit mechanism 108, and the two-dimensional image sensor 112. The hyperspectral imaging system 100 can incorporate other components which are well known to those skilled in the art but for clarity only those components 106, 108, 110, 112, 114, 116, 118 and 120 which are needed to explain and enable the present disclosure will be discussed in detail herein.

The hyperspectral imaging system 100 is positioned such that the optics 106 receive light 115a from the remote object 104 and are configured to direct focused light 115b to the scannable slit mechanism 108. The scannable slit mechanism 108 is positioned such that the surface 109 which receives the light 115b from the optics 106 is placed at an image plane of the optics 106. The scannable slit mechanism 108 receives the light 115b and provides at least one first line of light 115c to the spectrometer 110. In this example, the spectrometer 110 is configured as an Offner spectrometer and includes a first mirror 122 that receives the at least one first line of light 115c from the scannable slit mechanism 108 and reflects the at least one first line of light 115d to the diffraction grating 116 which directs at least one diffracted light 115e to a secondary mirror 124 which reflects the at least one diffracted light 115f to the two-dimensional image sensor 112. The two-dimensional image sensor 112 generates a two-dimensional image 117a of the at least one diffracted light 115f. The controller 114 receives and stores the two-dimensional image 117a and then interacts with the scannable slit mechanism 108 such that it is reconfigured to provide at least one different line of light 115g from the remote object 104 to the spectrometer 110. The spectrometer's first mirror 122 receives the at least one different line of light 115g from the scannable slit mechanism 108 and reflects the at least one different line of light 115h to the diffraction grating 116 which directs at least one diffracted light 115i to a secondary mirror 124 which reflects the at least one diffracted light 115j to the two-dimensional image sensor 112. The two-dimensional image sensor 112 generates a two-dimensional image 117b of the at least one diffracted light 115j. The controller 114 receives and stores the two-dimensional image 117b of the diffracted light 115j from the two-dimensional image sensor 112. Thereafter, the controller 114 interacts with the scannable slit mechanism 108 and the two-dimensional image sensor 112 in a similar manner to obtain different two-dimensional images 117c, 117d . . . 117n associated with different lines of light from the remote object 104. The controller 114 combines the two-dimensional images 117a, 117b, 117c . . . 117n to provide the hyperspectral image 102 of an area of the remote object 104. A detailed discussion about the configuration and operation of several different embodiments of the hyperspectral imaging system 100 incorporating several different types of scannable slit mechanisms 108 in accordance with the present disclosure is provided below with respect to FIGS. 2-7.

Referring to FIGS. 2A-2D, there several diagrams illustrating the hyperspectral imaging system 100a in which the scannable slit mechanism 108a is a micro-electromechanical system spatial light modulator 108a (MEMS SLM 108a) in accordance with a first embodiment of the present invention. The hyperspectral imaging system 100a includes the optics 106, the scannable slit mechanism 108a, the spectrometer 110 (diffraction grating 116), the two-dimensional image sensor 112, the controller 114, the light dump 118, and the housing 120 (not shown). It should be appreciated that the optics 106, the scannable slit mechanism 108a, the spectrometer 110 (diffraction grating 116), and the two-dimensional image sensor 112 would be positioned with respect to one another such that the light rays would be properly directed from one component to another component. However, to help explain the various features of the hyperspectral imaging system 110a the locations and orientations of the optics 106, the scannable slit mechanism 108a, the spectrometer 110 (diffraction grating 116), and the two-dimensional image sensor 112 have been changed. For instance, the scannable slit mechanism 108a has a surface 109a which is shown as facing the reader but in practice the surface 109a would be facing the major surfaces of the optics 106. Furthermore, the spectrometer 110 would be positioned to receive the one or more lines of light reflected from the scannable slit mechanism 108a.

As shown in FIGS. 2A-2B, there is an example where the hyperspectral imaging system 100a is configured such that the MEMS SLM 108a has one slit 204a activated at a first time "t1" (see FIG. 2A) and then another slit 204b activated at a second time "t2" (see FIG. 2B). In FIG. 2A, the hyperspectral imaging system 100a is positioned at the first time "t1" such that the optics 106 receive light 115a associated with the remote object 104. The MEMS SLM 108a has a surface 109a positioned to receive the light 115b from the optics 106. The surface 109a is positioned at an image plane of the optics 106. In addition, the surface 109a has an array of mirrors 206 including multiple rows of mirrors $206a_1, 206a_2 \ldots 206a_n$ and multiple columns of mirrors $206b_1, 206b_2 \ldots 206b_n$ formed on a semiconductor chip 210. The controller 114 interacts with the semiconductor chip 210 to have actuators (or the like) move any one or any number of the individual mirrors 206 to an "on-position" to reflect light 115b from the optics 106 to the spectrometer 110. The remaining mirrors 206 in the "off-position" would reflect the light 115b received thereon away from the spectrometer 110 and if used the light dump 118 can be positioned to receive this reflected light. For instance, the controller 114 can interact with the semiconductor chip 210 to activate (e.g., tilt) either one row (or a portion of one row) of the mirrors $206a_1, 206a_2 \ldots 206a_n$ or one column (or a portion of one column) of the mirrors $206b_1, 206b_2 \ldots 206b_n$ to form the first slit 204a and reflect a first line of light 115c to the spectrometer 110 which is eventually directed to the diffraction grating 116 by way of, for example, the first mirror 122 (not shown). Again, the spectrometer 110 can be any well known spectrometer 110 which has a diffraction grating 116. In this example, the controller 114 interacts with the semiconductor chip 210 to activate the column of mirrors $206b_4$ to form the first slit 204a and reflect the first line of light 115c to the spectrometer 110 which is eventually received by the diffraction grating 116 located therein. The diffraction grating 116 generates diffracted light 115e which is eventually received by the two-dimensional image sensor 112 by way of, for example, the second mirror 124 (not shown). The two-dimensional image sensor 112 generates a two-dimensional image 117a which includes one axis 210a representing the spatial information of the diffracted light 115e and another axis 210b representing the spectral information of the diffracted light 115e. The controller 114 receives and stores the two-dimensional image 117a and then interacts with the MEMS SLM 108a at time "t2" such that it is reconfigured to reflect a different line of light 115g from the remote object 104 to the spectrometer 110 as discussed next.

In FIG. 2B, the hyperspectral imaging system 100a is shown configured at the second time "t2" where the controller 114 interacts with the semiconductor chip 210 to deactivate (move to off-position) the column of mirrors $206b_4$ and activate (move to on-position) the adjacent column of mirrors $206b_5$ to form the second slit 204b. The activated second slit 204b reflects the second line of light 115g to the spectrometer 110 which is eventually received by the diffraction grating 116 by way of, for example, the first mirror 122 (not shown). The diffraction grating 116 generates diffracted light 115i which is eventually received by the two-dimensional image sensor 112 by way of, for example, the second mirror 124 (not shown). The two-dimensional image sensor 112 generates a two-dimensional image 117b which includes one axis 210a representing the spatial information of the diffracted light 115i and another axis 210b representing the spectral information of the diffracted light 115i. The controller 114 receives and stores the two-dimensional image 117b. Thereafter, the controller 114 interacts with the MEMS SLM 108a and the two-dimensional image sensor 112 in a similar manner to sequentially deactivate a column of mirrors $206b_5, 206b_6 \ldots 206b_{n-1}$ and activate the adjacent column of mirrors $206b_6, 206b_7 \ldots 206b_n$ to obtain different two-dimensional images 117c, 117d . . . 117n associated with different lines of light from the remote object 104. The controller 114 combines the two-dimensional images 117a, 117b, 117c . . . 117n to provide the hyperspectral image 102 of an area of the remote object 104.

Figure 2D:
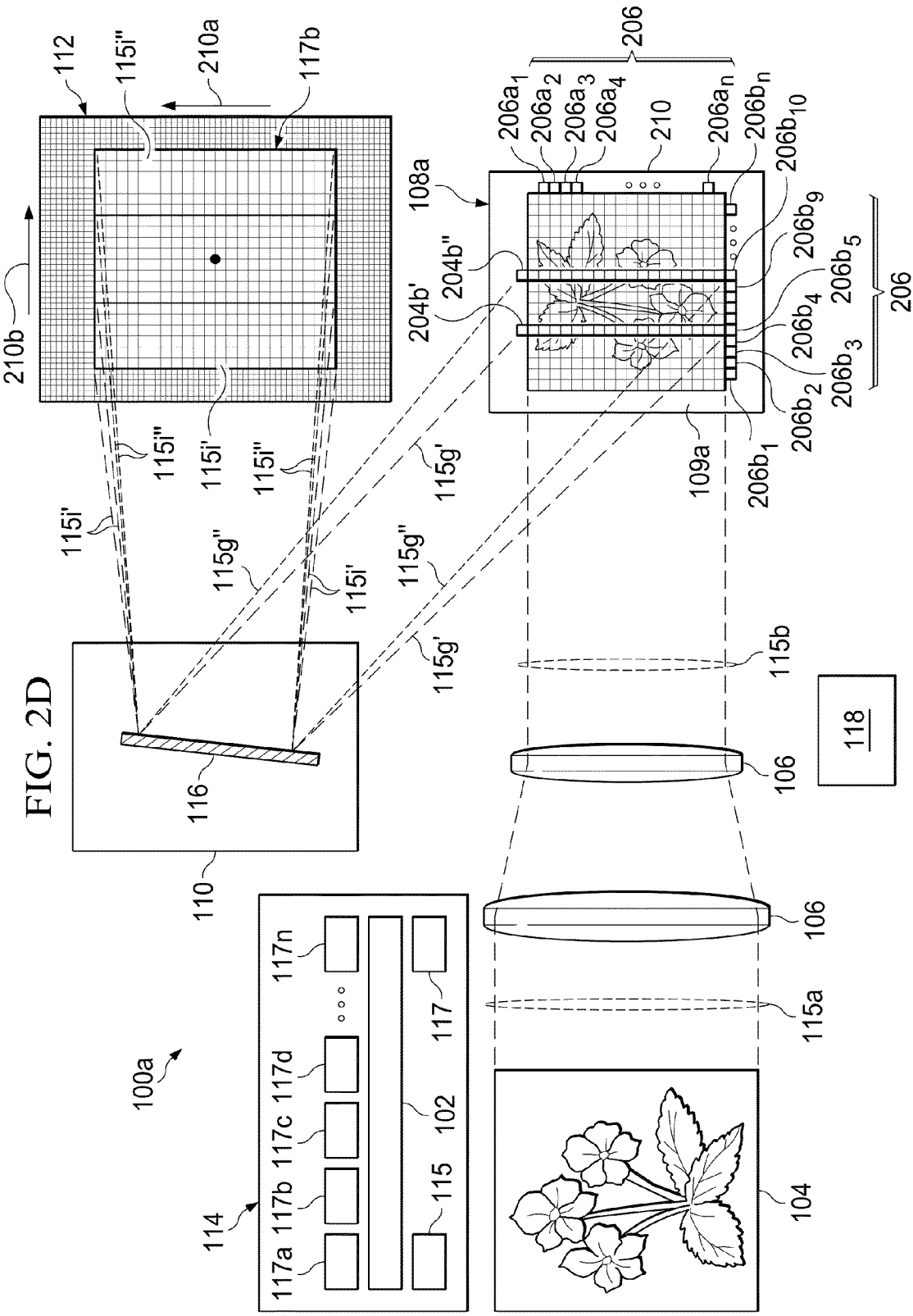

As shown in FIGS. 2C-2D, there is an example where the hyperspectral imaging system 100a is configured such that the MEMS SLM 108a has multiple slits 204a' and 204a" (two shown in this example) activated at a first time "t1" (see FIG. 2C) and then multiple slits 204b' and 204b" (two shown in this example) activated at a second time "t2" (see FIG. 2D). In FIG. 2C, the hyperspectral imaging system 100a is shown configured at time "t1" where the controller 114 interacts with the semiconductor chip 210 to activate two separated columns of mirrors $206b_4$ and $206b_9$ to respectively form the first slits 204a' and 204a". The activated first slits 204a' and 204a" reflect the first line of lights 115c' and 115c" to the spectrometer 110 which are eventually received by the diffraction grating 116 by way of, for example, the first mirror 122 (not shown). The diffraction grating 116 generates diffracted light 115e' and 115e" which are eventually received by the two-dimensional image sensor 112 by way of, for example, the second mirror 124 (not shown). The two-dimensional image sensor 112 generates a two-dimensional image 117a which includes one axis 210a representing the spatial information of the diffracted light 115e' and 115e" and another axis 210b representing the spectral information of the diffracted light 115e' and 115e". The controller 114 receives and stores the two-dimensional image 117a. It should be appreciated that the activated slits 204a' and 204a" would be separated from one another by the spectral band of interest so that the diffracted light 115e' and 115e" are separated from one another in the two-dimensional image 117a. The controller 114 upon receiving and storing the two-dimensional image 117a then interacts with the MEMS SLM 108a at time "t2" such that it is reconfigured to reflect two different lines of light 115g' and 115g" from the remote object 104 to the spectrometer 110 as discussed next.

In FIG. 2D, the hyperspectral imaging system 100a is shown configured at the second time "t2" where the controller 114 interacts with the semiconductor chip 210 to deactivate (move to off-position) the columns of mirrors $206b_4$ and $206b_9$ and activate (move to on-position) the adjacent columns of mirrors $206b_5$ and $206b_{10}$ to form the second slits 204b' and 204b". The activated second slits 204b' and 204b" reflect the second line of lights 115g' and 115g" to the spectrometer 110 which are eventually received by the diffraction grating 116 by way of, for example, the first mirror 122 (not shown). The diffraction grating 116 generates diffracted light 115$i'$ and 115$i''$ which are eventually received by the two-dimensional image sensor 112 by way of, for example, the second mirror 124 (not shown). The two-dimensional image sensor 112 generates a two-dimensional image 117$b$ which includes one axis 210$a$ representing the spatial information of the diffracted light 115$i'$ and 115$i''$ and another axis 210$b$ representing the spectral information of the diffracted light 115$i'$ and 115$i''$. The controller 114 receives and stores the two-dimensional image 117$b$. Thereafter, the controller 114 interacts with the MEMS SLM 108$a$ and the two-dimensional image sensor 112 in a similar manner to sequentially deactivate multiple columns of mirrors 206$b_5$/206$b_{10}$, 206$b_6$/206$b_{11}$ ... 206$b_x$/206$b_{n-1}$ and activate the adjacent multiple columns of mirrors 206$b_6$/206$b_{11}$, 206$b_7$/206$b_{11}$ ... 206$b_{x+1}$/206$b_n$ to obtain different two-dimensional images 117$c$, 117$d$ ... 117$n$ associated with different lines of light from the remote object 104. The controller 114 combines the two-dimensional images 117$a$, 117$b$, 117$c$ ... 117$n$ to provide the hyperspectral image 102 of an area of the remote object 104.

Referring to FIGS. 3A-3D, there several diagrams illustrating the hyperspectral imaging system 100$b$ in which the scannable slit mechanism 108$b$ is a diffractive Micro-Opto-Electro-Mechanical Systems (MOEMS) spatial light modulator (SLM) 108$b$ (also known as a Grating Light Valve™ 108$b$) in accordance with a second embodiment of the present disclosure. The hyperspectral imaging system 100$b$ includes the optics 106, the scannable slit mechanism 108$b$, the spectrometer 110 (diffraction grating 116), the two-dimensional image sensor 112, the controller 114, the light dump 118, and the housing 120 (not shown). It should be appreciated that the optics 106, the scannable slit mechanism 108$b$, the spectrometer 110 (diffraction grating 116), and the two-dimensional image sensor 112 would be positioned with respect to one another such that the light rays would be properly directed from one component to another component. However, to help explain the various features of the hyperspectral imaging system 110$b$ the locations and orientations of the optics 106, the scannable slit mechanism 108$b$, the spectrometer 110 (diffraction grating 116), and the two-dimensional image sensor 112 have been changed. For instance, the scannable slit mechanism 108$b$ has a surface 109$b$ which is shown as facing the reader but in practice the surface 109$b$ would be facing the major surfaces of the optics 106. Furthermore, the spectrometer 110 would be positioned to receive the one or more lines of light reflected from the scannable slit mechanism 108$b$.

Figure 3A:
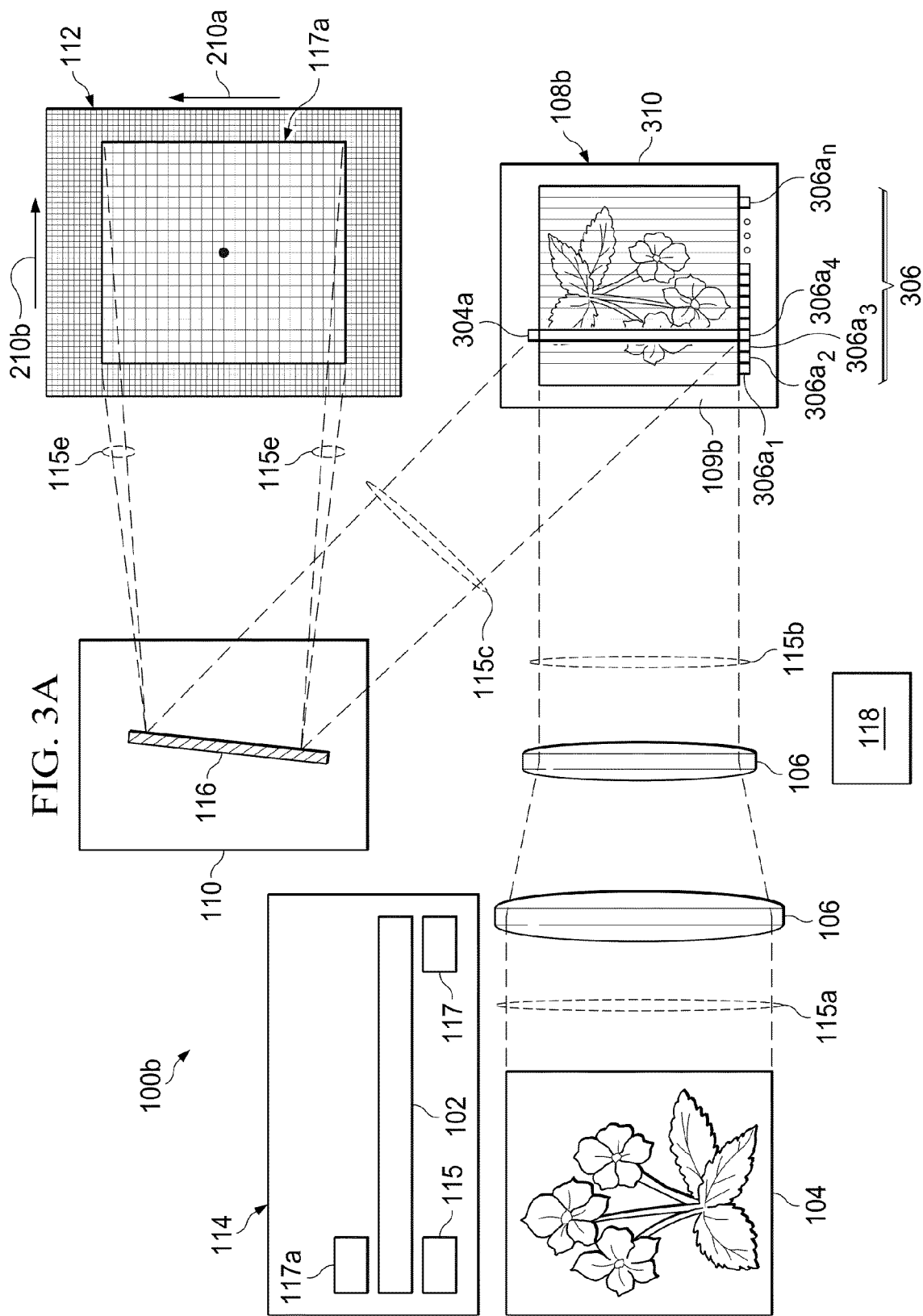

As shown in FIGS. 3A-3B, there is an example where the hyperspectral imaging system 100$b$ is configured such that the MOEMS SLM 108$b$ has one slit 304$a$ activated at a first time "t1" (see FIG. 3A) and then another slit 304$b$ activated at a second time "t2" (see FIG. 3B). In FIG. 3A, the hyperspectral imaging system 100$b$ is positioned at the first time "t1" such that the optics 106 receive light 115$a$ associated with the remote object 104. The MOEMS SLM 108$b$ has a surface 109$b$ positioned to receive the light 115$b$ from the optics 106. The surface 109$b$ is positioned at an image plane of the optics 106. In addition, the surface 109$b$ has a series of ribbons 306$a_1$, 306$a_2$, 306$a_3$ ... 306$a$, formed on a semiconductor chip 310. The controller 114 interacts with the semiconductor chip 310 to have actuators (or the like) move any one of the individual ribbons 306$a_1$, 306$a_2$, 306$a_3$ ... 306$a_n$ to an "on-position" to reflect light 115$b$ from the optics 106 to the spectrometer 110. The remaining ribbons 306$a_1$, 306$a_2$, 306$a_3$ ... 306$a_n$ which are in the "off-position" would reflect the light 115$b$ received thereon away from the spectrometer 110 and if used the light dump 118 can be positioned to receive this reflected light. In this example, the controller 114 interacts with the semiconductor chip 310 to activate (e.g., tilt) the ribbon 306$a_4$ (for example) to form the first slit 304$a$ and reflect a first line of light 115$c$ to the spectrometer 110 which is eventually directed to the diffraction grating 116 by way of, for example, the first mirror 122 (not shown). Again, the spectrometer 110 can be any well known spectrometer 110 which has a diffraction grating 116. The diffraction grating 116 generates diffracted light 115$e$ which is eventually received by the two-dimensional image sensor 112 by way of, for example, the second mirror 124 (not shown). The two-dimensional image sensor 112 generates a two-dimensional image 117$a$ which includes one axis 310$a$ representing the spatial information of the diffracted light 115$e$ and another axis 310$b$ representing the spectral information of the diffracted light 115$e$. The controller 114 receives and stores the two-dimensional image 117$a$ and then interacts with the MOEMS SLM 108$b$ at time "t2" such that it is reconfigured to reflect a different line of light 115$g$ from the remote object 104 to the spectrometer 110 as discussed next.

In FIG. 3B, the hyperspectral imaging system 100$b$ is shown configured at the second time "t2" where the controller 114 interacts with the semiconductor chip 310 to deactivate (move to off-position) the ribbon 306$a_4$ and activate (move to on-position) the adjacent ribbon 306$a_5$ to form the second slit 304$b$. The activated second slit 304$b$ reflects the second line of light 115$g$ to the spectrometer 110 which is eventually received by the diffraction grating 116 by way of, for example, the first mirror 122 (not shown). The diffraction grating 116 generates diffracted light 115$i$ which is eventually received by the two-dimensional image sensor 112 by way of, for example, the second mirror 124 (not shown). The two-dimensional image sensor 112 generates a two-dimensional image 117$b$ which includes one axis 310$a$ representing the spatial information of the diffracted light 115$i$ and another axis 310$b$ representing the spectral information of the diffracted light 115$i$. The controller 114 receives and stores the two-dimensional image 117$b$. Thereafter, the controller 114 interacts with the MOEMS SLM 108$a$ and the two-dimensional image sensor 112 in a similar manner to sequentially deactivate the ribbon 306$a_5$, 306$a_6$ ... 306$a_{n-1}$ and activate the adjacent ribbon 306$a_6$, 306$a_7$ ... 306$a_n$ to obtain different two-dimensional images 117$c$, 117$d$ ... 117$n$ associated with different lines of light from the remote object 104. The controller 114 combines the two-dimensional images 117$a$, 117$b$, 117$c$ ... 117$n$ to provide the hyperspectral image 102 of an area of the remote object 104.

Figure 3C:
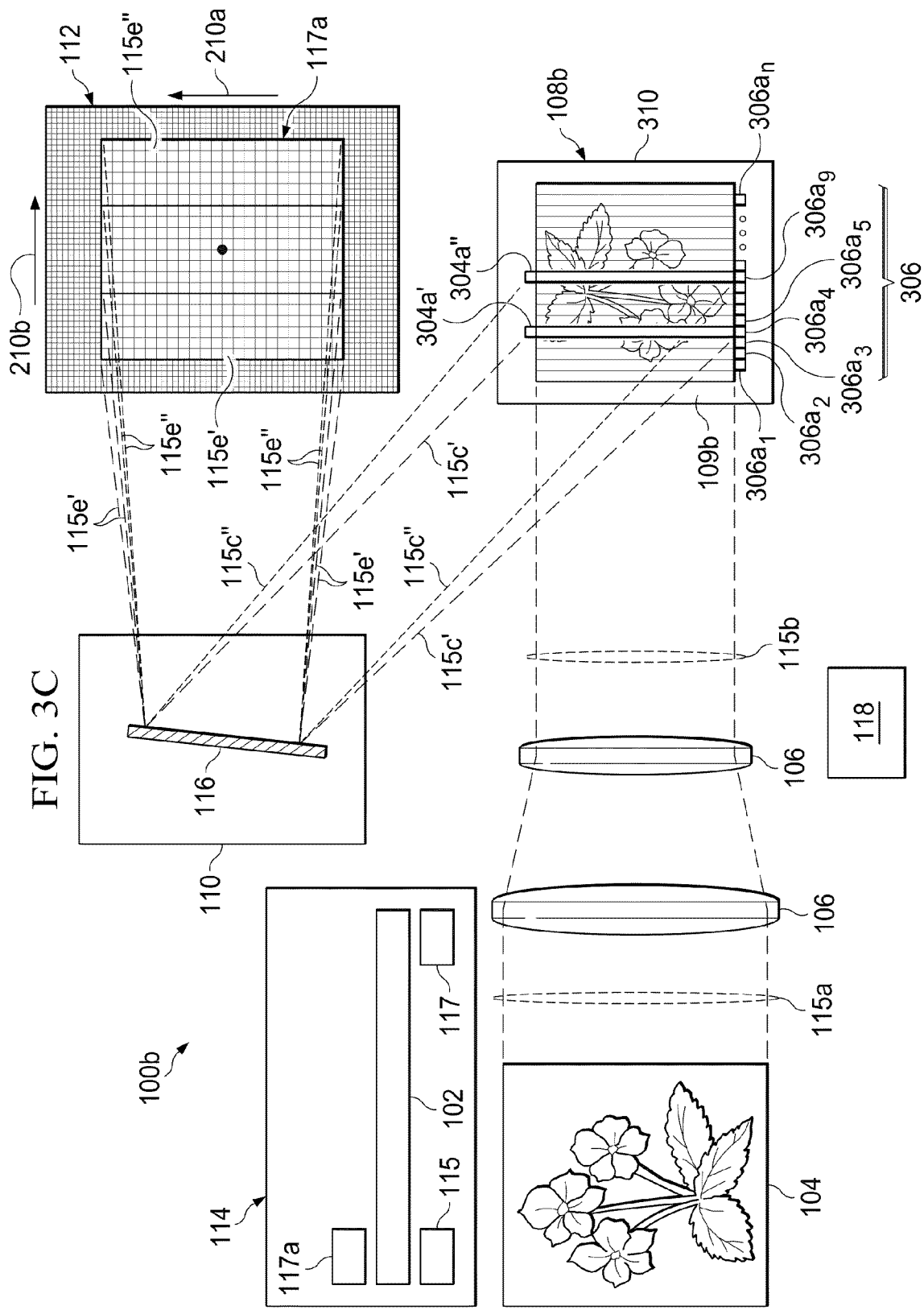

As shown in FIGS. 3C-3D, there is an example where the hyperspectral imaging system 100$b$ is configured such that the MOEMS SLM 108$b$ has multiple slits 304$a'$ and 304$a''$ (two shown in this example) activated at a first time "t1" (see FIG. 3C) and then multiple slits 304$b'$ and 304$b''$ (two shown in this example) activated at a second time "t2" (see FIG. 3D). In FIG. 3C, the hyperspectral imaging system 100$b$ is shown configured at the time "t1" where the controller 114 interacts with the semiconductor chip 310 to activate two separated ribbons 306$a_4$ and 306$a_9$ to respectively form the first slits 304$a'$ and 304$a''$. The activated first slits 304$a'$ and 304$a''$ reflect the first line of lights 115$c'$ and 115$c''$ to the spectrometer 110 which are eventually received by the diffraction grating 116 by way of, for example, the first mirror 122 (not shown). The diffraction grating 116 generates diffracted light 115$e'$ and 115$e''$ which are eventually received by the two-dimensional image sensor 112 by way of, for example, the second mirror 124 (not shown). The two-dimensional image sensor 112 generates a two-dimensional image 117a which includes one axis 310a representing the spatial information of the diffracted light 115e' and 115e" and another axis 310b representing the spectral information of the diffracted light 115e' and 115e". The controller 114 receives and stores the two-dimensional image 117a. It should be appreciated that the activated slits 304a' and 304a" would be separated from one another by the spectral band of interest so that the diffracted light 115e' and 115e" are separated from one another in the two-dimensional image 117a. As discussed next, the controller 114 upon receiving and storing the two-dimensional image 117a then interacts with the MOEMS SLM 108b at time "t2" such that it is reconfigured to reflect two different lines of light 115g' and 115g" from the remote object 104 to the spectrometer 110.

In FIG. 3D, the hyperspectral imaging system 100b is shown configured at the second time "t2" where the controller 114 interacts with the semiconductor chip 310 to deactivate (move to off-position) the ribbons $306a_4$ and $306a_9$ and activate (move to on-position) the adjacent ribbons $306a_5$ and $306a_{10}$ to form the second slits 304b' and 304b". The activated second slits 304b' and 304b" reflect the second line of lights 115g' and 115g" to the spectrometer 110 which are eventually received by the diffraction grating 116 by way of, for example, the first mirror 122 (not shown). The diffraction grating 116 generates diffracted light 115i' and 115i" which are eventually received by the two-dimensional image sensor 112 by way of, for example, the second mirror 124 (not shown). The two-dimensional image sensor 112 generates a two-dimensional image 117b which includes one axis 310a representing the spatial information of the diffracted light 115i' and 115i" and another axis 310b representing the spectral information of the diffracted light 115i' and 115i". The controller 114 receives and stores the two-dimensional image 117b. Thereafter, the controller 114 interacts with the MOEMS SLM 108b and the two-dimensional image sensor 112 in a similar manner to sequentially deactivate multiple ribbons $306a_5/306a_{10}$, $306a_6/306a_{11}$ ... $306a_x/306a_{n-1}$ and activate the adjacent multiple ribbons $306a_6/306a_{11}$, $306a_7/306a_{12}$ ... $306a_{x+1}/306a_n$ to obtain different two-dimensional images 117c, 117d ... 117n associated with different lines of light from the remote object 104. The controller 114 combines the two-dimensional images 117a, 117b, 117c ... 117n to provide the hyperspectral image 102 of an area of the remote object 104.

Referring to FIGS. 4A-4D, there several diagrams illustrating the hyperspectral imaging system 100c in which the scannable slit mechanism 108c is a digital light processing (DLP) system 108c in accordance with a third embodiment of the present invention. The hyperspectral imaging system 100c includes the optics 106, the scannable slit mechanism 108c, the spectrometer 110 (diffraction grating 116), the two-dimensional image sensor 112, the controller 114, the light dump 118, and the housing 120 (not shown). It should be appreciated that the optics 106, the scannable slit mechanism 108c, the spectrometer 110 (diffraction grating 116), and the two-dimensional image sensor 112 would be positioned with respect to one another such that the light rays would be properly directed from one component to another component. However, to help explain the various features of the hyperspectral imaging system 110c the locations and orientations of the optics 106, the scannable slit mechanism 108c, the spectrometer 110 (diffraction grating 116), and the two-dimensional image sensor 112 have been changed. For instance, the scannable slit mechanism 108c has a surface 109c which is shown as facing the reader but in practice the surface 109c would be facing the major surfaces of the optics 106. Furthermore, the spectrometer 110 would be positioned to receive the one or more lines of light reflected from the scannable slit mechanism 108c. Also for clarity, the various well-known components of the DLP system 108c such as lenses, filters etc. ... have not been described herein and only the components needed to explain the present disclosure have been described.

Figure 4B:
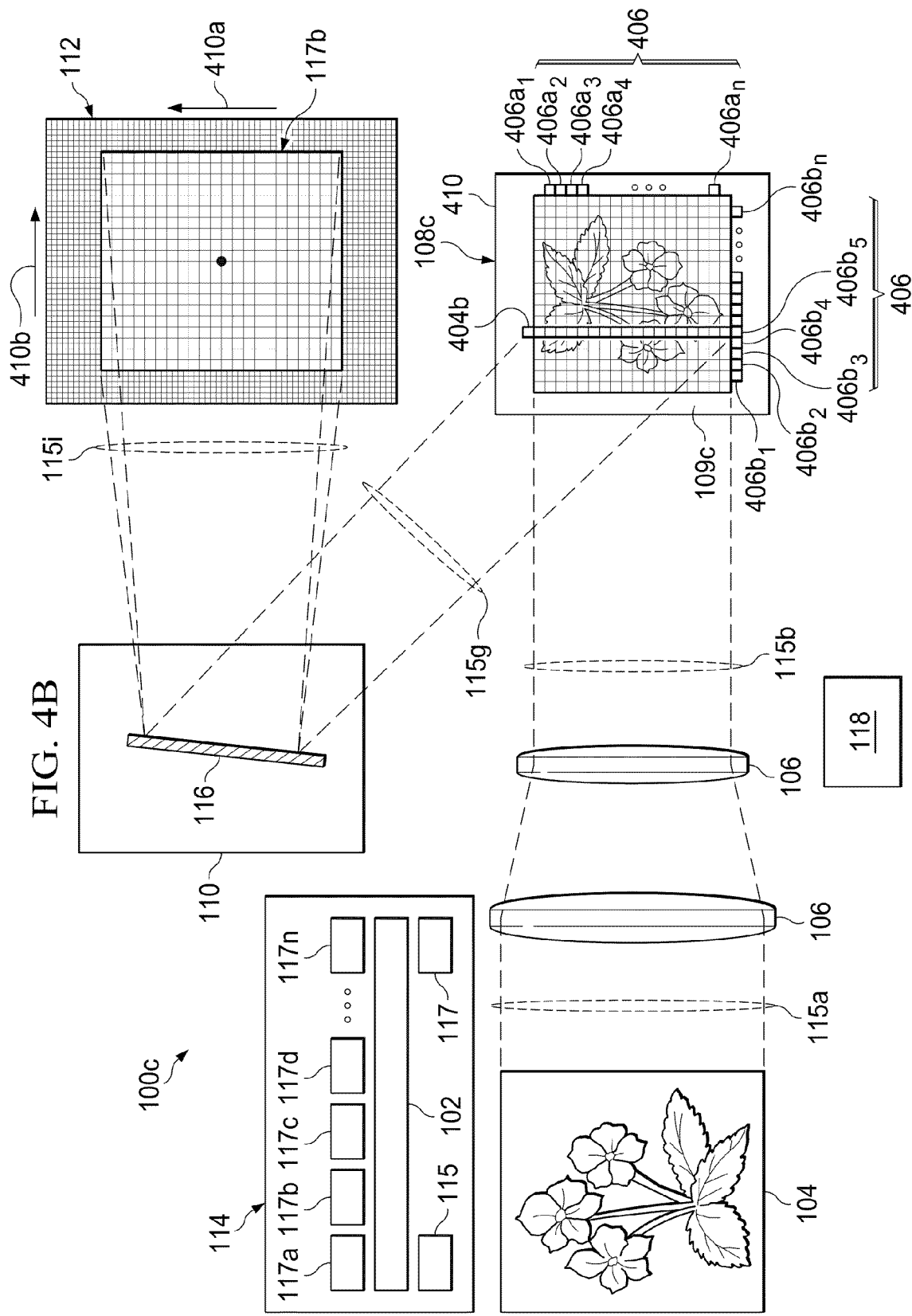

As shown in FIGS. 4A-4B, there is an example where the hyperspectral imaging system 100c is configured such that the DLP system 108c has one slit 404a activated at a first time "t1" (see FIG. 4A) and then another slit 404b activated at a second time "t2" (see FIG. 4B). In FIG. 4A, the hyperspectral imaging system 100c is positioned at the first time "t1" such that the optics 106 receive light 115a associated with the remote object 104. The DLP system 108c has a surface 109c positioned to receive the light 115b from the optics 106. The surface 109c is positioned at an image plane of the optics 106. In addition, the surface 109c has an array of mirrors 406 including multiple rows of mirrors $406a_1, 406a_2 \ldots 406a_n$ and multiple columns of mirrors $406b_1, 406b_2 \ldots 406b_n$ formed on a semiconductor chip 410. The controller 114 interacts with the semiconductor chip 410 to have actuators (or the like) move any one or any number of the individual mirrors 406 to an "on-position" to reflect light 115b from the optics 106 to the spectrometer 110. The remaining mirrors 406 in the "off-position" would reflect the light 115b received thereon away from the spectrometer 110 and if used the light dump 118 can be positioned to receive this reflected light. For instance, the controller 114 can interact with the semiconductor chip 410 to activate (e.g., tilt) either one row (or a portion of one row) of the mirrors $406a_1, 406a_2 \ldots 406a_n$ or one column (or a portion of one column) of the mirrors $406b_1, 406b_2 \ldots 406b_n$ to form the first slit 404a and reflect a first line of light 115c to the spectrometer 110 which is eventually directed to the diffraction grating 116 by way of, for example, the first mirror 122 (not shown). Again, the spectrometer 110 can be any well known spectrometer 110 which has a diffraction grating 116. In this example, the controller 114 interacts with the semiconductor chip 410 to activate the column of mirrors $406b_4$ to form the first slit 404a and reflect the first line of light 115c to the spectrometer 110 which is eventually received by the diffraction grating 116 located therein. The diffraction grating 116 generates diffracted light 115e which is eventually received by the two-dimensional image sensor 112 by way of, for example, the second mirror 124 (not shown). The two-dimensional image sensor 112 generates a two-dimensional image 117a which includes one axis 410a representing the spatial information of the diffracted light 115e and another axis 410b representing the spectral information of the diffracted light 115e. The controller 114 receives and stores the two-dimensional image 117a and then interacts with the DLP system 108c at time "t2" such that it is reconfigured to reflect a different line of light 115g from the remote object 104 to the spectrometer 110 as discussed next.

In FIG. 4B, the hyperspectral imaging system 100c is shown configured at the second time "t2" where the controller 114 interacts with the semiconductor chip 410 to deactivate (move to off-position) the column of mirrors $406b_4$ and activate (move to on-position) the adjacent column of mirrors $406b_5$ to form the second slit 404b. The activated second slit 404b reflects the second line of light 115g to the spectrometer 110 which is eventually received by the diffraction grating 116 by way of, for example, the first mirror 122 (not shown). The diffraction grating 116 generates diffracted light 115i which is eventually received by the two-dimensional image sensor 112 by way of, for example, the second mirror 124 (not shown). The two-dimensional image sensor 112 generates a two-dimensional image 117b which includes one axis 410a representing the spatial information of the diffracted light 115i and another axis 410b representing the spectral information of the diffracted light 115i. The controller 114 receives and stores the two-dimensional image 117b. Thereafter, the controller 114 interacts with the DLP system 108c and the two-dimensional image sensor 112 in a similar manner to sequentially deactivate a column of mirrors $406b_5$, $406b_6$ ... $406b_{n-1}$ and activate the adjacent column of mirrors $406b_6$, $406b_7$ ... $406b_n$ to obtain different two-dimensional images 117c, 117d ... 117n associated with different lines of light from the remote object 104. The controller 114 combines the two-dimensional images 117a, 117b, 117c ... 117n to provide the hyperspectral image 102 of an area of the remote object 104.

Figure 4C:
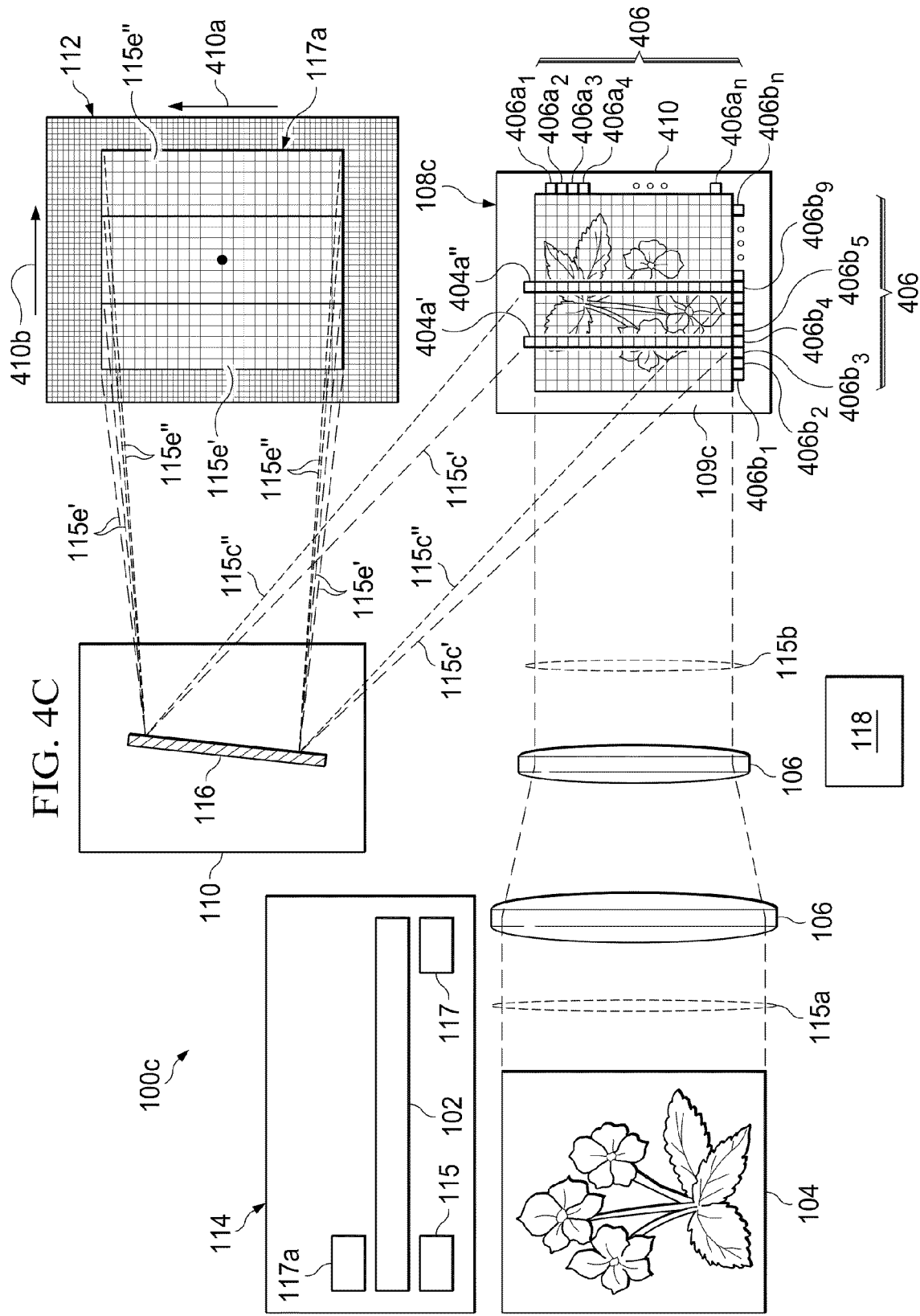
Figure 4D:
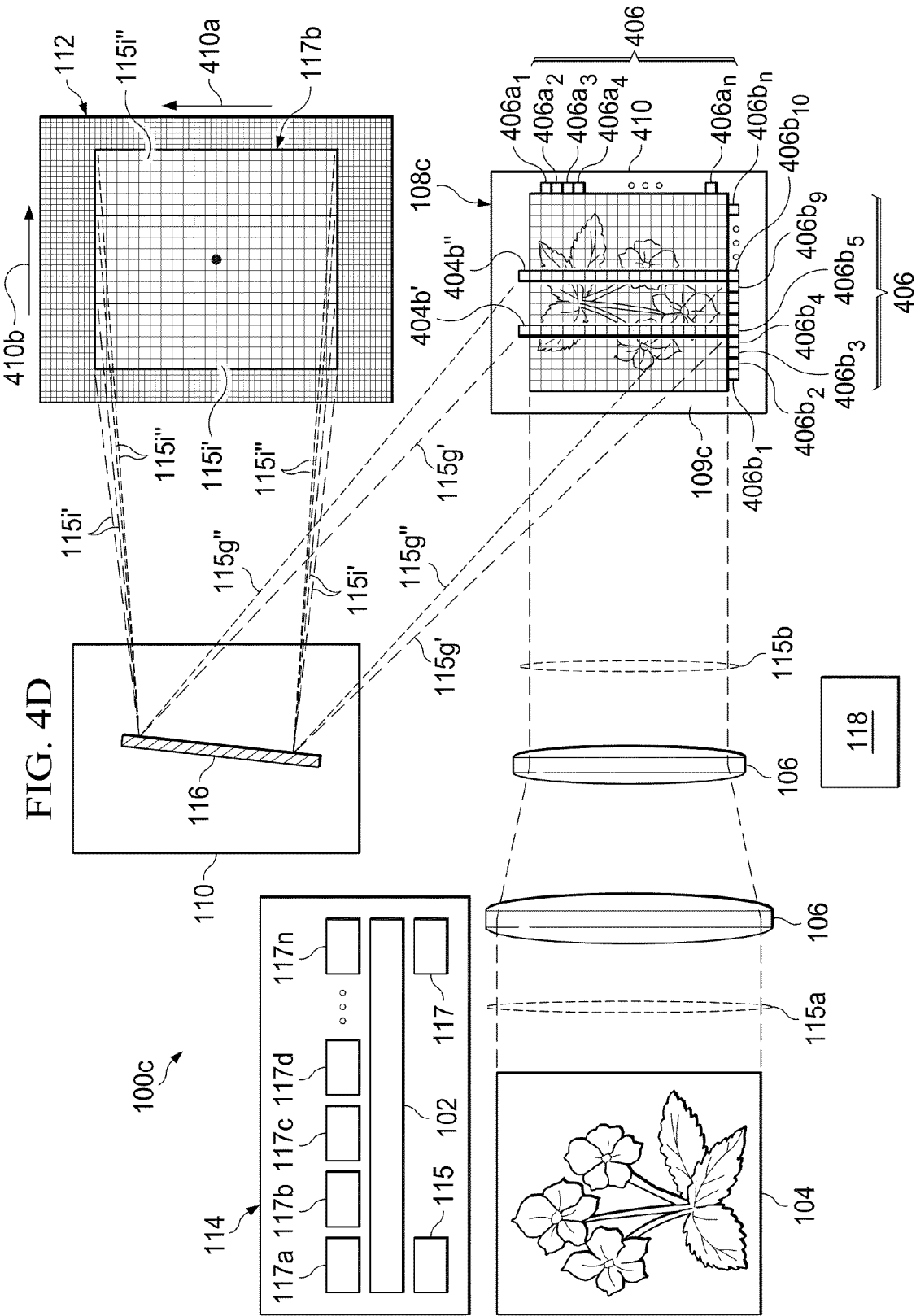

As shown in FIGS. 4C-4D, there is an example where the hyperspectral imaging system 100c is configured such that the DLP system 108c has multiple slits 404a' and 404a" (two shown in this example) activated at a first time "t1" (see FIG. 4C) and then multiple slits 404b' and 404b" (two shown in this example) activated at a second time "t2" (see FIG. 4D). In FIG. 4C, the hyperspectral imaging system 100c is shown configured at time "t1" where the controller 114 interacts with the semiconductor chip 410 to activate two separated columns of mirrors $406b_4$ and $406b_9$ to respectively form the first slits 404a' and 404a". The activated first slits 404a' and 404a" reflect the first line of lights 115c' and 115c" to the spectrometer 110 which are eventually received by the diffraction grating 116 by way of, for example, the first mirror 122 (not shown). The diffraction grating 116 generates diffracted light 115e' and 115e" which are eventually received by the two-dimensional image sensor 112 by way of, for example, the second mirror 124 (not shown). The two-dimensional image sensor 112 generates a two-dimensional image 117a which includes one axis 410a representing the spatial information of the diffracted light 115e' and 115e" and another axis 410b representing the spectral information of the diffracted light 115e' and 115e". The controller 114 receives and stores the two-dimensional image 117a. It should be appreciated that the activated slits 404a' and 404a" would be separated from one another by the spectral band of interest so that the diffracted light 115f and 115f" are separated from one another in the two-dimensional image 117a. The controller 114 upon receiving and storing the two-dimensional image 117a then interacts with the DLP system 108c at time "t2" such that it is reconfigured to reflect two different lines of light 115g' and 115g" from the remote object 104 to the spectrometer 110 as discussed next.

In FIG. 4D, the hyperspectral imaging system 100a is shown configured at the second time "t2" where the controller 114 interacts with the semiconductor chip 410 to deactivate (move to off-position) the columns of mirrors $406b_4$ and $406b_9$ and activate (move to on-position) the adjacent columns of mirrors $406b_5$ and $406b_{10}$ to form the second slits 404b' and 404b". The activated second slits 404b' and 404b" reflect the second line of lights 115g' and 115g" to the spectrometer 110 which are eventually received by the diffraction grating 116 by way of, for example, the first mirror 122 (not shown). The diffraction grating 116 generates diffracted light 115i' and 115i" which are eventually received by the two-dimensional image sensor 112 by way of, for example, the second mirror 124 (not shown). The two-dimensional image sensor 112 generates a two-dimensional image 117b which includes one axis 410a representing the spatial information of the diffracted light 115i' and 115i" and another axis 410b representing the spectral information of the diffracted light 115i' and 115i". The controller 114 receives and stores the two-dimensional image 117b. Thereafter, the controller 114 interacts with the DLP system 108c and the two-dimensional image sensor 112 in a similar manner to sequentially deactivate multiple columns of mirrors $406b_5/406b_{10}$, $406b_6/406b_{11}$ ... $406b_x/406b_{n-1}$ and activate the adjacent multiple columns of mirrors $406b_6/406b_{11}$, $406b_7/406b_{12}$ ... $406b_{x+1}/406b_n$ to obtain different two-dimensional images 117c, 117d ... 117n associated with different lines of light from the remote object 104. The controller 114 combines the two-dimensional images 117a, 117b, 117c ... 117n to provide the hyperspectral image 102 of an area of the remote object 104.

Referring to FIGS. 5A-5D, there several diagrams illustrating the hyperspectral imaging system 100d in which the scannable slit mechanism 108d is a Liquid Crystal Display 108d (LCD 108d) in accordance with a fourth embodiment of the present invention. The hyperspectral imaging system 100d includes the optics 106, the scannable slit mechanism 108d, the spectrometer 110 (diffraction grating 116), the two-dimensional image sensor 112, the controller 114, the light dump 118, and the housing 120 (not shown). It should be appreciated that the optics 106, the scannable slit mechanism 108d, the spectrometer 110 (diffraction grating 116), and the two-dimensional image sensor 112 would be positioned with respect to one another such that the light rays would be properly directed from one component to another component. However, to help explain the various features of the hyperspectral imaging system 110d the locations and orientations of the optics 106, the scannable slit mechanism 108d, the spectrometer 110 (diffraction grating 116), and the two-dimensional image sensor 112 have been changed. For instance, the scannable slit mechanism 108d has a surface 109d which is shown as facing the reader but in practice the surface 109d would be facing the major surfaces of the optics 106.

Figure 5B:
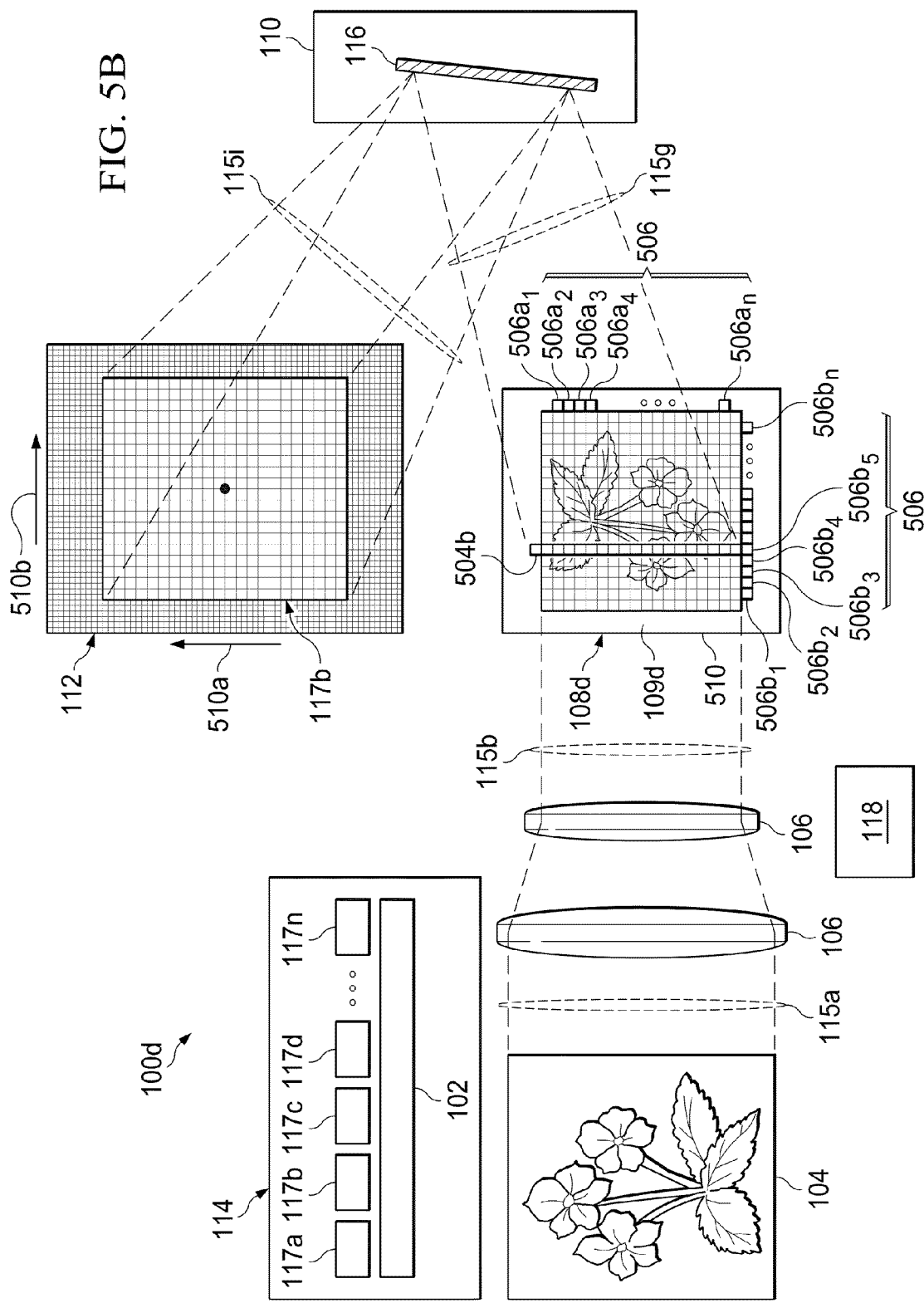

As shown in FIGS. 5A-5B, there is an example where the hyperspectral imaging system 100d is configured such that the LCD 108d has one slit 504a activated at a first time "t1" (see FIG. 5A) and then another slit 504b activated at a second time "t2" (see FIG. 5B). In FIG. 5A, the hyperspectral imaging system 100d is positioned at the first time "t1" such that the optics 106 receive light 115a associated with the remote object 104. The LCD 108d has a surface 109d positioned to receive the light 115b from the optics 106. The surface 109d is positioned at an image plane of the optics 106. In addition, the surface 109d has an array of pixels 506 including multiple rows of pixels $506a_1$, $506a_2$ ... $506a_n$ and multiple columns of pixels $506b_1$, $506b_2$ ... $506b_n$ associated with a semiconductor chip 510. The controller 114 interacts with the semiconductor chip 510 to activate any one or any number of the individual pixels 506 to an "on-position" to enable light 115b from the optics 106 to pass there through to the spectrometer 110. The remaining pixels 506 in the "off-position" would reflect the light 115b received thereon away from the spectrometer 110 and if used the light dump 118 can be positioned to receive this reflected light. For instance, the controller 114 can interact with the semiconductor chip 510 to activate either one row (or a portion of one row) of the pixels $506a_1$, $506a_2$ ... $506a_n$ or one column (or a portion of one column) of the pixels $506b_1$, $506b_2$ ... $506b_n$ to form the first slit 504a and pass a first line of light 115c there through to the spectrometer 110 which is eventually directed to the diffraction grating 116 by way of, for example, the first pixel 122 (not shown). Again, the spectrometer 110 can be any well known spectrometer 110 which has a diffraction grating 116. In this example, the controller 114 interacts with the semiconductor chip 510 to activate the column of pixels $506b_4$ to form the first slit 504a and enable the first line of light 115c to pass there through to the spectrometer 110 which is eventually received by the diffraction grating 116 located therein. The diffraction grating 116 generates diffracted light 115e which is eventually received by the two-dimensional image sensor 112 by way of, for example, the second pixel 124 (not shown). The two-dimensional image sensor 112 generates a two-dimensional image 117a which includes one axis 510a representing the spatial information of the diffracted light 115e and another axis 510b representing the spectral information of the diffracted light 115e. The controller 114 receives and stores the two-dimensional image 117a and then interacts with the LCD 108d at time "t2" such that it is reconfigured to enable a different line of light 115g from the remote object 104 to pass there through to the spectrometer 110 as discussed next.

In FIG. 5B, the hyperspectral imaging system 100d is shown configured at the second time "t2" where the controller 114 interacts with the semiconductor chip 510 to deactivate (change to off-position) the column of pixels $506b_4$ and activate (change to on-position) the adjacent column of pixels $506b_5$ to form the second slit 504b. The activated second slit 504b enables the second line of light 115g to pass there through to the spectrometer 110 which is eventually received by the diffraction grating 116 by way of, for example, the first mirror 122 (not shown). The diffraction grating 116 generates diffracted light 115i which is eventually received by the two-dimensional image sensor 112 by way of, for example, the second mirror 124 (not shown). The two-dimensional image sensor 112 generates a two-dimensional image 117b which includes one axis 510a representing the spatial information of the diffracted light 115i and another axis 510b representing the spectral information of the diffracted light 115i. The controller 114 receives and stores the two-dimensional image 117b. Thereafter, the controller 114 interacts with the LCD 108d and the two-dimensional image sensor 112 in a similar manner to sequentially deactivate a column of pixels $506b_5$, $506b_6$ . . . $506b_{n-1}$ and activate the adjacent column of pixels $506b_6$, $506b_7$ . . . $506b_n$ to obtain different two-dimensional images 117c, 117d . . . 117n associated with different lines of light from the remote object 104. The controller 114 combines the two-dimensional images 117a, 117b, 117c . . . 117n to provide the hyperspectral image 102 of an area of the remote object 104.

As shown in FIGS. 5C-5D, there is an example where the hyperspectral imaging system 100d is configured such that the LCD 508a has multiple slits 504a' and 504a" (two shown in this example) activated at a first time "t1" (see FIG. 5C) and then multiple slits 504b' and 504b" (two shown in this example) activated at a second time "t2" (see FIG. 5D). In FIG. 5C, the hyperspectral imaging system 100d is shown configured at time "t1" where the controller 114 interacts with the semiconductor chip 510 to activate two separated columns of pixels $506b_4$ and $506b_9$ to respectively form the first slits 504a' and 504a". The activated first slits 504a' and 504a" enable the first line of lights 115c' and 115c" to pass there through to the spectrometer 110 which are eventually received by the diffraction grating 116 by way of, for example, the first mirror 122 (not shown). The diffraction grating 116 generates diffracted light 115e' and 115e" which are eventually received by the two-dimensional image sensor 112 by way of, for example, the second mirror 124 (not shown). The two-dimensional image sensor 112 generates a two-dimensional image 117a which includes one axis 510a representing the spatial information of the diffracted light 115e' and 115e" and another axis 510b representing the spectral information of the diffracted light 115e' and 115e". The controller 114 receives and stores the two-dimensional image 117a. It should be appreciated that the activated slits 504a' and 504a" would be separated from one another by the spectral band of interest so that the diffracted light 115e' and 115e" are separated from one another in the two-dimensional image 117a. The controller 114 upon receiving and storing the two-dimensional image 117a then interacts with the LCD 108d at time "t2" such that it is reconfigured to reflect two different lines of light 115g' and 115g" from the remote object 104 to the spectrometer 110 as discussed next.

In FIG. 5D, the hyperspectral imaging system 100d is shown configured at the second time "t2" where the controller 114 interacts with the semiconductor chip 510 to deactivate (change to off-position) the columns of pixels $506b_4$ and $506b_9$ and activate (change to on-position) the adjacent columns of pixels $506b_5$ and $506b_{10}$ to form the second slits 504b' and 504b". The activated second slits 504b' and 504b" enable the second line of lights 115g' and 115g" to pass there through to the spectrometer 110 which are eventually received by the diffraction grating 116 by way of, for example, the first pixel 122 (not shown). The diffraction grating 116 generates diffracted light 115i' and 115i" which are eventually received by the two-dimensional image sensor 112 by way of, for example, the second pixel 124 (not shown). The two-dimensional image sensor 112 generates a two-dimensional image 117b which includes one axis 210a representing the spatial information of the diffracted light 115i' and 115i" and another axis 210b representing the spectral information of the diffracted light 115i' and 115i". The controller 114 receives and stores the two-dimensional image 117b. Thereafter, the controller 114 interacts with the LCD 108d and the two-dimensional image sensor 112 in a similar manner to sequentially deactivate multiple columns of pixels $506b_5/506b_{10}$, $506b_6/506b_{11}$ . . . $506b_x/506b_{n-1}$ and activate the adjacent multiple columns of pixels $506b_6/506b_{11}$, $506b_7/506b_{12}$ . . . $506b_{x+1}/506b_n$ to obtain different two-dimensional images 117c, 117d . . . 117n associated with different lines of light from the remote object 104. The controller 114 combines the two-dimensional images 117a, 117b, 117c . . . 117n to provide the hyperspectral image 102 of an area of the remote object 104.

Referring to FIGS. 6A-6D, there several diagrams illustrating the hyperspectral imaging system 100e in which the scannable slit mechanism 108e is a drum 602 with at least one slit 604 formed therein and an actuator 606 that rotates the drum 602 about axis 608 in accordance with one embodiment of the present invention. The hyperspectral imaging system 100e includes the optics 106, the scannable slit mechanism 108e, the spectrometer 110 (diffraction grating 116), the two-dimensional image sensor 112, the controller 114, the light dump 118, and the housing 120 (not shown). In this example, the drum 602 is sized such that the spectrometer 110 and the two-dimensional image sensor 112 would be positioned within an interior portion 609 of the drum 602. In any case, the optics 106, the scannable slit mechanism 108e, the spectrometer 110 (diffraction grating 116), and the two-dimensional image sensor 112 would be positioned with respect to one another such that the light rays would be properly directed from one component to another component. However, to help explain the various features of the hyperspectral imaging system 110e the orientations of the optics 106 with respect to the drum's slit 604 have been changed. For instance, the drum's slit 604 would typically be facing the major surfaces of the optics 106 rather than facing the reader as shown. Furthermore, it should be appreciated that the drum 602 can have many different shapes including for instance the shape of a truncated cone.

As shown in FIGS. 6A-6B, there is an example where the hyperspectral imaging system 100e is configured such that the drum 602 has slit 604 in one position "p1" at a first time "t1" (see FIG. 6A) and then the slit 604a is in another position "p2" at a second time "t2" (see FIG. 6B). In FIG. 6A, the hyperspectral imaging system 100e is positioned at the first time "t1" such that the optics 106 receive light 115a associated with the remote object 104. In particular, the controller 114 interacts with the actuator 606 to rotate the drum 602 on the axis 608 such that the slit 604 is in position "p1" at the first time "t1". At time "t1", the slit 604 is positioned at or near an image plane of the optics 106 so as to pass a first line of light 115c to the spectrometer 110 which is eventually directed to the diffraction grating 116 by way of, for example, the first mirror 122 (not shown). Again, the spectrometer 110 can be any well known spectrometer 110 which has a diffraction grating 116. The diffraction grating 116 generates diffracted light 115e which is eventually received by the two-dimensional image sensor 112 by way of, for example, the second mirror 124 (not shown). The two-dimensional image sensor 112 generates a two-dimensional image 117a which includes one axis 610a representing the spatial information of the diffracted light 115e and another axis 610b representing the spectral information of the diffracted light 115e. The controller 114 receives and stores the two-dimensional image 117a and then interacts with the actuator 606 to rotate the drum 602 such that the slit 604 is in position "p2" at time "t2" to pass a different line of light 115g from the remote object 104 to the spectrometer 110 as discussed next.

In FIG. 6B, the hyperspectral imaging system 100e is shown configured at the second time "t2" where the controller 114 interacted with the actuator 606 to rotate the drum 602 such that the slit 604 is in position "p2" at time "t2" so as to pass a second line of light 115g to the spectrometer 110 which is eventually received by the diffraction grating 116 by way of, for example, the first mirror 122 (not shown). The diffraction grating 116 generates diffracted light 115i which is eventually received by the two-dimensional image sensor 112 by way of, for example, the second mirror 124 (not shown). The two-dimensional image sensor 112 generates a two-dimensional image 117b which includes one axis 610a representing the spatial information of the diffracted light 115i and another axis 610b representing the spectral information of the diffracted light 115i. The controller 114 receives and stores the two-dimensional image 117b. Thereafter, the controller 114 interacts with actuator 606 to sequentially rotate the drum 602 at different times "t3", "t4" . . . "tn" into positions "p3", "p4" . . . "pn" while at times "t3", "t4" . . . "tn" the two-dimensional image sensor 112 is activated to obtain different two-dimensional images 117c, 117d . . . 117n associated with different lines of light from the remote object 104. The controller 114 combines the two-dimensional images 117a, 117b, 117c . . . 117n to provide the hyperspectral image 102 of an area of the remote object 104.

Figure 6C:
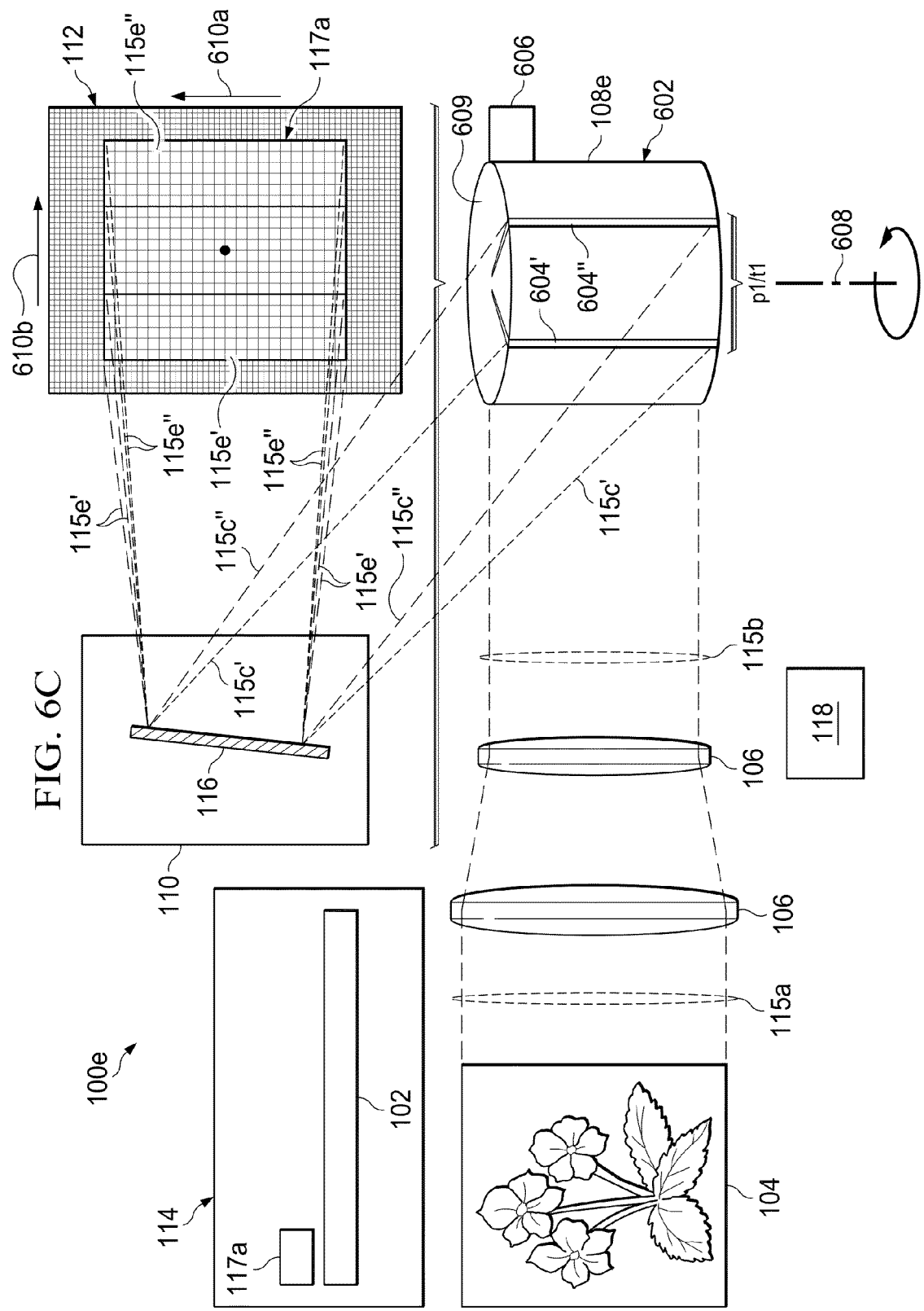

As shown in FIGS. 6C-6D, there is an example where the hyperspectral imaging system 100e is configured such that the drum 602 has multiple slits 604' and 604" (two shown in this example) which are moved from one position to another position "p1", "p2" . . . "pn" in sequence by the actuator 606 at times "t1", "t2" . . . . "tn" to generate a hyperspectral image 102 of an area of a remote object 104. In FIG. 6C, the hyperspectral imaging system 100e is shown configured at time "t1" where the controller 114 interacts with the actuator 606 to rotate the drum 602 into position "p1" such that the slits 604' and 604" pass the first line of lights 115c' and 115c" to the spectrometer 110 which are eventually received by the diffraction grating 116 by way of, for example, the first mirror 122 (not shown). The diffraction grating 116 generates diffracted light 115e' and 115e" which are eventually received by the two-dimensional image sensor 112 by way of, for example, the second mirror 124 (not shown). The two-dimensional image sensor 112 generates a two-dimensional image 117a which includes one axis 610a representing the spatial information of the diffracted light 115e' and 115e" and another axis 610b representing the spectral information of the diffracted light 115e' and 115e". The controller 114 receives and stores the two-dimensional image 117a. It should be appreciated that the slits 604' and 604" would be separated from one another by the spectral band of interest so that the diffracted light 115e' and 115e" are separated from one another in the two-dimensional image 117a. The controller 114 upon receiving and storing the two-dimensional image 117a then at time "t2" interacts with the actuator 606 to rotate the drum 602 into position "p2" such that the slits 604' and 604" pass two different lines of light 115g' and 115g" from the remote object 104 to the spectrometer 110 as discussed next.

In FIG. 6D, the hyperspectral imaging system 100e is shown configured at the second time "t2" where the controller 114 interacts with actuator 606 to rotate the drum 602 into position "p2" such that the slits 604' and 604" pass the second line of lights 115g' and 115g" into the spectrometer 110 which are eventually received by the diffraction grating 116 by way of, for example, the first mirror 122 (not shown). The diffraction grating 116 generates diffracted light 115i' and 115i" which are eventually received by the two-dimensional image sensor 112 by way of, for example, the second mirror 124 (not shown). The two-dimensional image sensor 112 generates a two-dimensional image 117b which includes one axis 610a representing the spatial information of the diffracted light 115i' and 115i" and another axis 610b representing the spectral information of the diffracted light 115i' and 115i". The controller 114 receives and stores the two-dimensional image 117b. Thereafter, the controller 114 interacts at times "t3, "t4" . . . "tn" with the actuator 606 to sequentially rotate the drum 602 into positions "p3", "p4" . . . "pn" such that the slits 604a' and 604a" pass two different lines of light from the remote object 104 into the spectrometer 110 to obtain different two-dimensional images 117c, 117d . . . 117n. The controller 114 combines the two-dimensional images 117a, 117b, 117c . . . 117n to provide the hyperspectral image 102 of an area of the remote object 104.

Referring to FIGS. 7A-7D, there are several diagrams illustrating the hyperspectral imaging system 100f in which the scannable slit mechanism 108f is a disk 702 with at least one slit 704 formed therein and an actuator 706 that rotates the disk 702 about axis 708 in accordance with a sixth embodiment of the present invention. The hyperspectral imaging system 100f includes the optics 106, the scannable slit mechanism 108f, the spectrometer 110 (diffraction grating 116), the two-dimensional image sensor 112, the controller 114, the light dump 118, and the housing 120 (not shown). It should be appreciated that the optics 106, the scannable slit mechanism 108f, the spectrometer 110 (diffraction grating 116), and the two-dimensional image sensor 112 would be positioned with respect to one another such that the light rays would be properly directed from one component to another component. However, to help explain the various features of the hyperspectral imaging system 110f the orientations of the optics 106 with respect to the disk's slit 704 have been changed. For instance, the disk's slit 704 would in practice be facing the major surfaces of the optics 106 rather than facing the reader as shown. And, the plane of rotation of the disk 702 on axis 708 would be perpendicular to the reader.

Figure 7A:
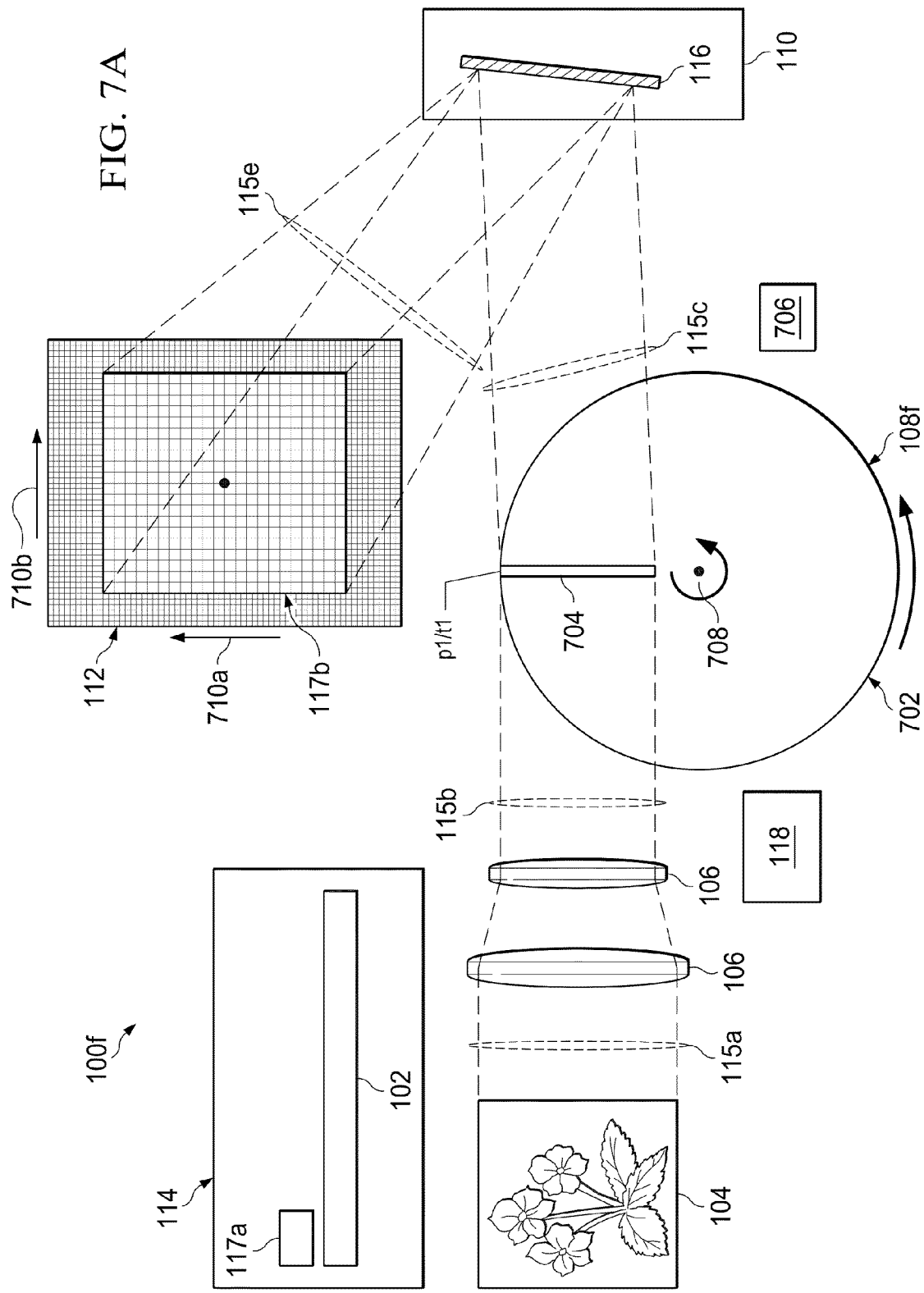
FIGS. 7A-7D are several diagrams illustrating the hyperspectral imaging system shown in FIG. 1 where the scannable slit mechanism incorporated therein is a disk with at least one slit formed therein and an actuator that rotates the disk in accordance with a sixth embodiment of the present invention.
Figure 7B:
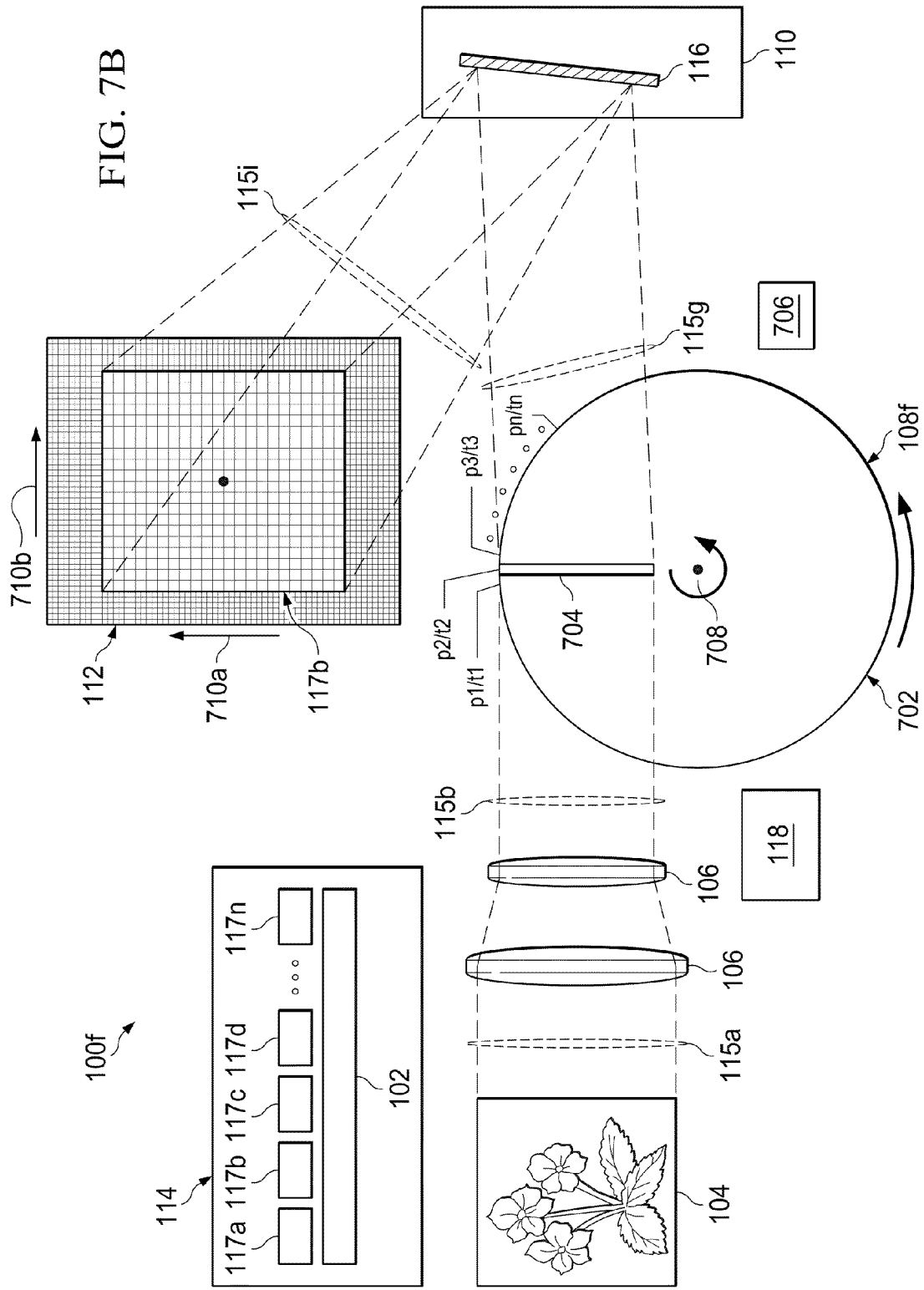

As shown in FIGS. 7A-7B, there is an example where the hyperspectral imaging system 100f is configured such that the disk 702 has one slit 704 in one position "p1" at a first time "t1" (see FIG. 7A) and then the slit 704 is in another position "p2" at a second time "t2" (see FIG. 7B). In FIG. 7A, the hyperspectral imaging system 100f is positioned at the first time "t1" such that the optics 106 receive light 115a associated with the remote object 104. In particular, the controller 114 interacts with the actuator 706 to rotate the disk 702 on the axis 708 such that the slit 704 is in position "p1" at the first time "t1". At time "t1", the slit 704 is positioned at or near an image plane of the optics 106 so as to pass a first line of light 115c to the spectrometer 110 which is eventually directed to the diffraction grating 116 by way of, for example, the first mirror 122 (not shown). Again, the spectrometer 110 can be any well known spectrometer 110 which has a diffraction grating 116. The diffraction grating 116 generates diffracted light 115e which is eventually received by the two-dimensional image sensor 112 by way of, for example, the second mirror 124 (not shown). The two-dimensional image sensor 112 generates a two-dimensional image 117a which includes one axis 710a representing the spatial information of the diffracted light 115e and another axis 710b representing the spectral information of the diffracted light 115e. The controller 114 receives and stores the two-dimensional image 117a and then interacts with the actuator 706 to rotate the disk 702 such that the slit 704 is in position "p2" at time "t2" to pass a different line of light 115g from the remote object 104 to the spectrometer 110 as discussed next.

In FIG. 7B, the hyperspectral imaging system 100f is shown configured at the second time "t2" where the controller 114 interacted with the actuator 706 to rotate the disk 702 such that the slit 704 is in position "p2" at time "t2" so as to pass a second line of light 115g into the spectrometer 110 which is eventually received by the diffraction grating 116 by way of, for example, the first mirror 122 (not shown). The diffraction grating 116 generates diffracted light 115i which is eventually received by the two-dimensional image sensor 112 by way of, for example, the second mirror 124 (not shown). The two-dimensional image sensor 112 generates a two-dimensional image 117b which includes one axis 710a representing the spatial information of the diffracted light 115i and another axis 710b representing the spectral information of the diffracted light 115i. The controller 114 receives and stores the two-dimensional image 117b. Thereafter, the controller 114 interacts with actuator 706 to rotate the disk 702 at different times "t3", "t4"... "tn" so that the slit 704 is in positions "p3", "p4"... "pn" while at times "t3", "t4"... "tn" the two-dimensional image sensor 112 is activated to obtain different two-dimensional images 117c, 117d... 117n associated with different lines of light from the remote object 104. The controller 114 combines the two-dimensional images 117a, 117b, 117c... 117n to provide the hyperspectral image 102 of an area of the remote object 104.

Figure 7C:
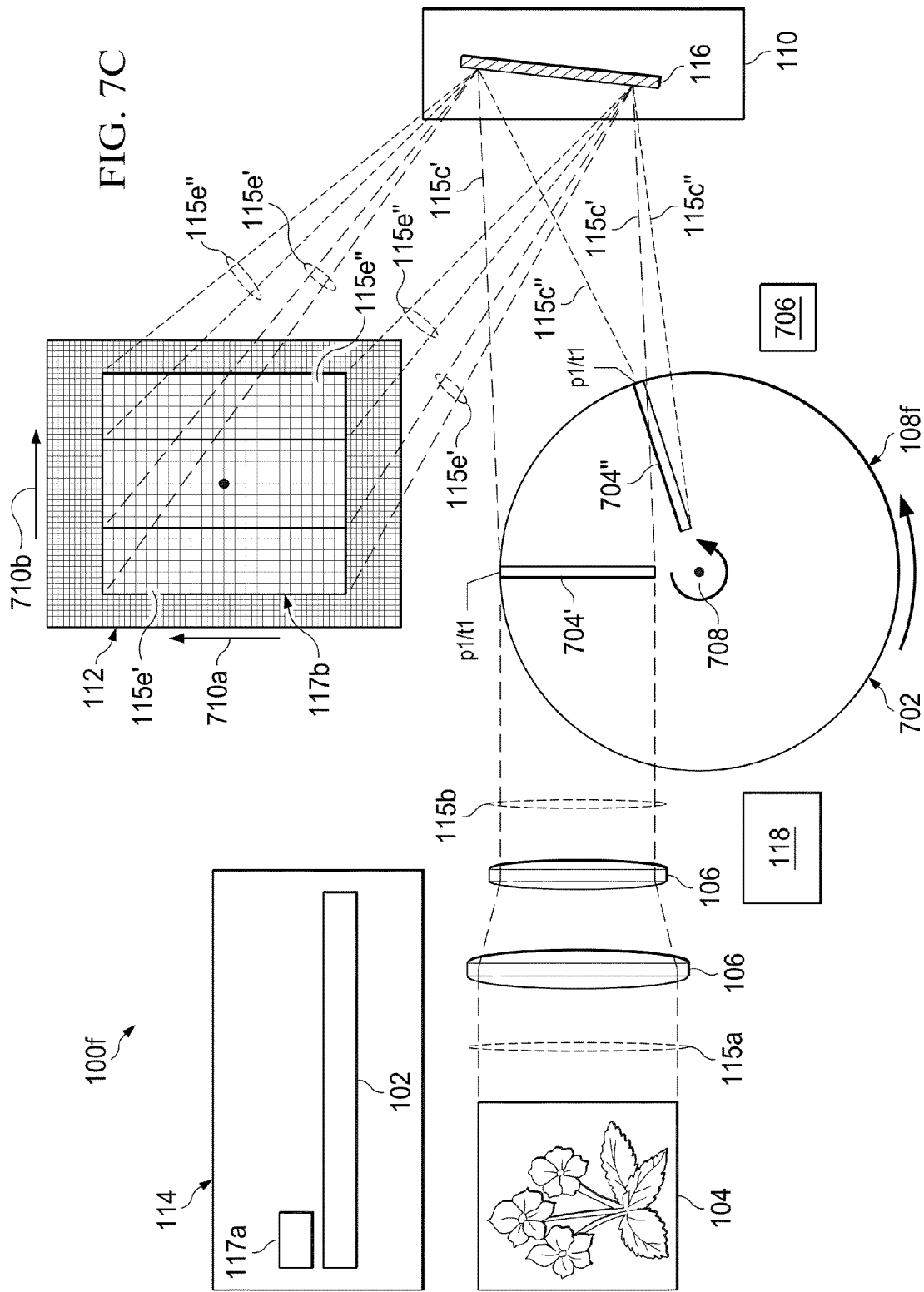
Figure 7D:
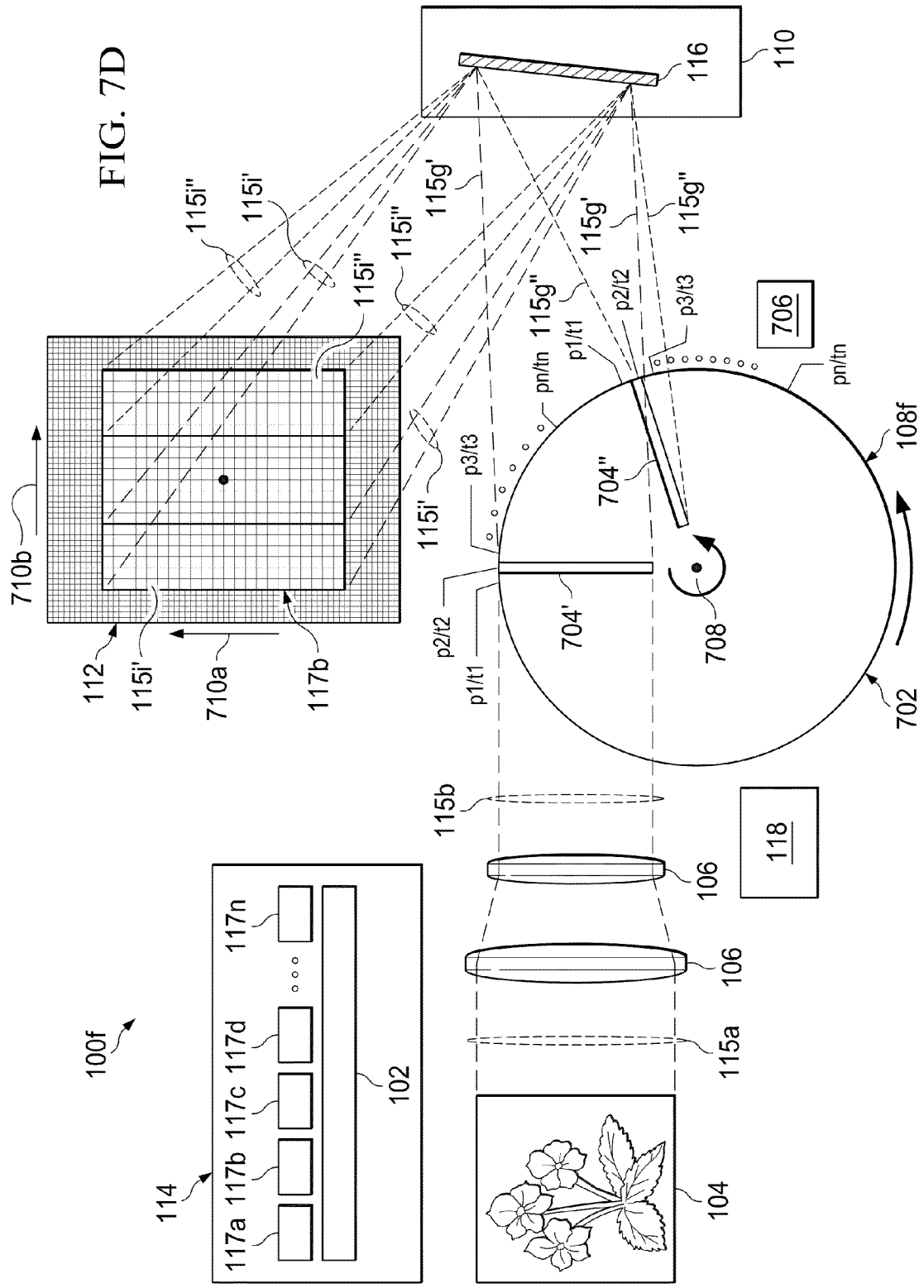

As shown in FIGS. 7C-7D, there is an example where the hyperspectral imaging system 100f is configured such that the disk 702 has multiple slits 704' and 704" (two shown in this example) which are moved from one position to another position "p1", "p2"... "pn" in sequence by the actuator 706 at times "t1", "t2".... "tn" to generate a hyperspectral image 102 of an area of a remote object 104. In FIG. 7C, the hyperspectral imaging system 100f is shown configured at time "t1" where the controller 114 interacts with the actuator 706 to rotate the disk 702 into position "p1" such that the slits 704' and 704" pass the first line of lights 115c' and 115c" to the spectrometer 110 which are eventually received by the diffraction grating 116 by way of, for example, the first mirror 122 (not shown). The diffraction grating 116 generates diffracted light 115e' and 115e" which are eventually received by the two-dimensional image sensor 112 by way of, for example, the second mirror 124 (not shown). The two-dimensional image sensor 112 generates a two-dimensional image 117a which includes one axis 710a representing the spatial information of the diffracted light 115e' and 115e" and another axis 710b representing the spectral information of the diffracted light 115e' and 115e". The controller 114 receives and stores the two-dimensional image 117a. It should be appreciated that the slits 704' and 704" would be separated from one another by the spectral band of interest so that the diffracted light 115e' and 115e" are separated from one another in the two-dimensional image 117a. The controller 114 upon receiving and storing the two-dimensional image 117a then at time "t2" interacts with the actuator 706 to rotate the disk 702 into position "p2" such that the slits 704' and 704" pass two different lines of light 115g' and 115g" from the remote object 104 to the spectrometer 110 as discussed next.

In FIG. 7D, the hyperspectral imaging system 100f is shown configured at the second time "t2" where the controller 114 interacts with actuator 706 to rotate the drum 702 into position "p2" such that the slits 704' and 704" pass the second line of lights 115g' and 115g" into the spectrometer 110 which are eventually received by the diffraction grating 116 by way of, for example, the first mirror 122 (not shown). The diffraction grating 116 generates diffracted light 115i' and 115i" which are eventually received by the two-dimensional image sensor 112 by way of, for example, the second mirror 124 (not shown). The two-dimensional image sensor 112 generates a two-dimensional image 117b which includes one axis 710a representing the spatial information of the diffracted light 115i' and 115i" and another axis 710b representing the spectral information of the diffracted light 115i' and 115i". The controller 114 receives and stores the two-dimensional image 117b. Thereafter, the controller 114 interacts at times "t3, "t4"... "tn" with the actuator 706 to sequentially rotate the disk 702 into positions "p3", "p4"... "pn" such that the slits 704a' and 704a" pass two different lines of light from the remote object 104 into the spectrometer 110 to obtain different two-dimensional images 117c, 117d... 117n. The controller 114 combines the two-dimensional images 117a, 117b, 117c... 117n to provide the hyperspectral image 102 of an area of the remote object 104.

From the foregoing, one skilled in the art will appreciate that the present disclosure pertains to a hyperspectral imaging system 100 and method for providing a hyperspectral image 102 of an area of a remote object 104 (e.g., scene of interest 104). The method comprises the steps of: (a) providing the hyperspectral imaging system 100 which includes the aforementioned optics 106, the scannable slit mechanism 108, the spectrometer 110, the two-dimensional image sensor 112, and the controller 114; (b) controlling the scannable slit mechanism 108 and the two-dimensional image sensor 112 to synchronize at a first time "t1" the activation (positioning) of at least one first slit 204a, 204a', 204a", 304a, 304a', 304a", 404a, 404a', 404a", 504a, 504a', 504a", 604, 604', 604", 704, 704', 704" and the imaging of at least one first diffracted image 117a, and then synchronize at a second time "t2" the deactivation (positioning) of the at least one first slit 204a, 204a', 204a", 304a, 304a', 304a", 404a, 404a', 404a", 504a, 504a', 504a", 604, 604', 604", 704, 704', 704", the activation (positioning) of the at least one second slit 204b, 204b', 204b", 304b, 304b', 304b", 404b, 404b', 404b", 504b, 504b', 504b", 604, 604', 604", 704, 704', 704", and the imaging of the at least one second diffracted image 177b; and (c) combining the two dimensional images of the at least one first diffracted image 117a and the at least one second diffracted image 117b to provide the hyperspectral image 102 of the area of the remote object 104.

To accomplish this, the controller 114 may include a processor 115 that interfaces with a memory 117 which stores processor-executable instructions to execute those processor-executable instructions to control the scannable slit mechanism 108 and the two-dimensional image sensor 112 to synchronize at the first time "t1" the activation (positioning) of the at least one first slit 204a, 204a', 204a", 304a, 304a', 304a", 404a, 404a', 404a", 504a, 504a', 504a", 604, 604', 604", 704, 704', 704" and the activation of the two-dimensional image sensor 112 to image the first diffracted image 117a, and then synchronize at the second time "t2" the deactivation (positioning) of the at least one first slit 204a, 204a', 204a", 304a, 304a', 304a", 404a, 404a', 404a", 504a, 504a', 504a", 604, 604a', 604", 704, 704', 704", the activation (positioning) of the at least one second slit 204b, 204b', 204b", 304b, 304b', 304b", 404b, 404b', 404b", 504b, 504b', 504b", 604, 604', 604", 704, 704', 704", and the activation of the two-dimensional image sensor 112 to image the second diffracted image 117b etc. . . . The controller 114 may also control the optics 106 so as to focus them on the remote object 104. One skilled in the art will appreciate that this method is an improvement on the "push broom" method in that the spectrometer 110 can be in a fixed location, e.g. hand held. Plus, this method is an improvement on the "rotating mirror" method in that the scanning component (i.e., the scannable slit mechanism 108) is smaller, lighter and would require lower power to operate.

As described herein, the hyperspectral imaging system 100 utilizes a scannable slit mechanism 108 which is placed at the image plane of the optics 106 (e.g. taking lens 106). The scannable slit mechanism 108 sends one or more 1-dimensional lines selected from the image plane into the spectrometer 110, while rejecting the light outside those lines. The scannable slit mechanism 108 may be transmissive or reflective or diffractive. The light rejected may be absorbed by the scannable slit mechanism 108 or reflected in another direction, or reflected to the light dump 118 if provided. The scannable slit mechanism 108 may have many different configurations some of which are as follows:

1) MEMS SLM 108a (see FIGS. 2A-2D)
2) GLV 108b (see FIGS. 3A-3D)
3) DLP 108c (see FIGS. 4A-4D)
4) LCD 108d (see FIGS. 5A-5D)
5) Rotating drum with slits 108e (see FIGS. 6A-6D)
6) Rotating disk with slits 108f (see FIGS. 7A-7D)

For instance, in the MEMS SLM 108a embodiment, the spectral information from the remote object 104 (scene 104) is imaged thru a series of optics 106 onto a collection of slits 204a, 204b, 204a', 204a", 204b', and 204b" in this case represented by a MEMS array 210. The MEMS array 210 can be operated such that a row or column of mirrors is in the "on" position (in a further embodiment, multiple rows or columns of mirrors may be in the "on" position) so that light from the taking lens that falls on this part of the MEMS device is directed to the spectrometer 110 while the other rows or columns mirrors which are in the "off" position direct the light which falls on this part of the MEMS device is directed away from the spectrometer 110. In this way, all of the spectral information from a finite spatial part of the remote object 104 may be directed at a given time the spectrometer 110 by the row(s) or column(s) of mirrors in the "on" position. In particular, the row(s) or column(s) of mirrors in the MEMS array 210 in the "on" position reflects the spectral information from a specific row or column of the image 104 to the diffraction grating 116 that then spreads the spectral information as well as the spatial information onto a high resolution image sensor 112. The image sensor 112 has one axis which corresponds to the spatial information and another axis which corresponds to the spectral information. The spatial information corresponds to the number of rows or columns in the MEMS array 210 and the spectral information is determined by the diffraction grating 116. Whereas, the row(s) or column(s) of mirrors in the MEMS array 210 in the "off" position could reflect the received light away from the spectrometer 110 and to the light dump 118 (for instance). If desired, the hyperspectral imaging system 100 could incorporate multiple scannable slit mechanisms 108 each corresponding to a specific spectral band with the optics, sensor and diffraction grating chosen based on the band of interest (e.g., ultraviolet (UV), visible (VIS), near infrared (NIR), mid-wavelength infrared (MWIR) and long-wavelength infrared (LWIR)).

Furthermore, for the case of the DPL 108c, when a single row of mirrors is in the "on" state, that row acts as the slit of the spectrometer 110. If the row of "on" mirrors is incremented from row n to row n+1, the image is scanned across the spectrometer 110. Synchronizing the DLP 108c and the image taking allows the controller 114 to reconstruct a 2-dimensional image of the remote object 104. If desired, one could control the DLP 108c to activate multiple rows of mirrors to emulate multiple slits. For instance, the DLP 108c could at time "t1" activate rows n, n+50, n+100, n+150 and at time "t2" activate rows n+1, n+51, n+101, n+151.

In the case of the rotating drum 602, the drum 602 has a single slit 604 or multiple slits 604' and 604" of a transmissive nature or a reflective nature and the rotation of the drum 602 is synchronized with the image taking so that the 2-dimensional image of the remote object 104 can be constructed. It should be appreciated that for purposes of the discussion herein the drum's slit(s) 604, 604' and 604" is/are considered to be "activated" only when in a position at the time in which an image 117a, 177b, 117c . . . 117n is obtained and to be "deactivated" at other times. The same is true for the rotating disk 702.

Moreover, it should be appreciated that the inventive concept associated with the aforementioned scannable slit mechanism 108 can be used in hyperspectral imaging systems that are configured differently than the ones described above with respect to FIGS. 1-7. For instance, the inventive concept can be used in a dual-channel hyperspectral imaging system which incorporates two gratings and two image sensors to provide one or more hyperspectral images of an area of a remote object. An exemplary dual-channel hyperspectral imaging system is described below with respect to FIGS. 8A-8B.

Figure 8A:
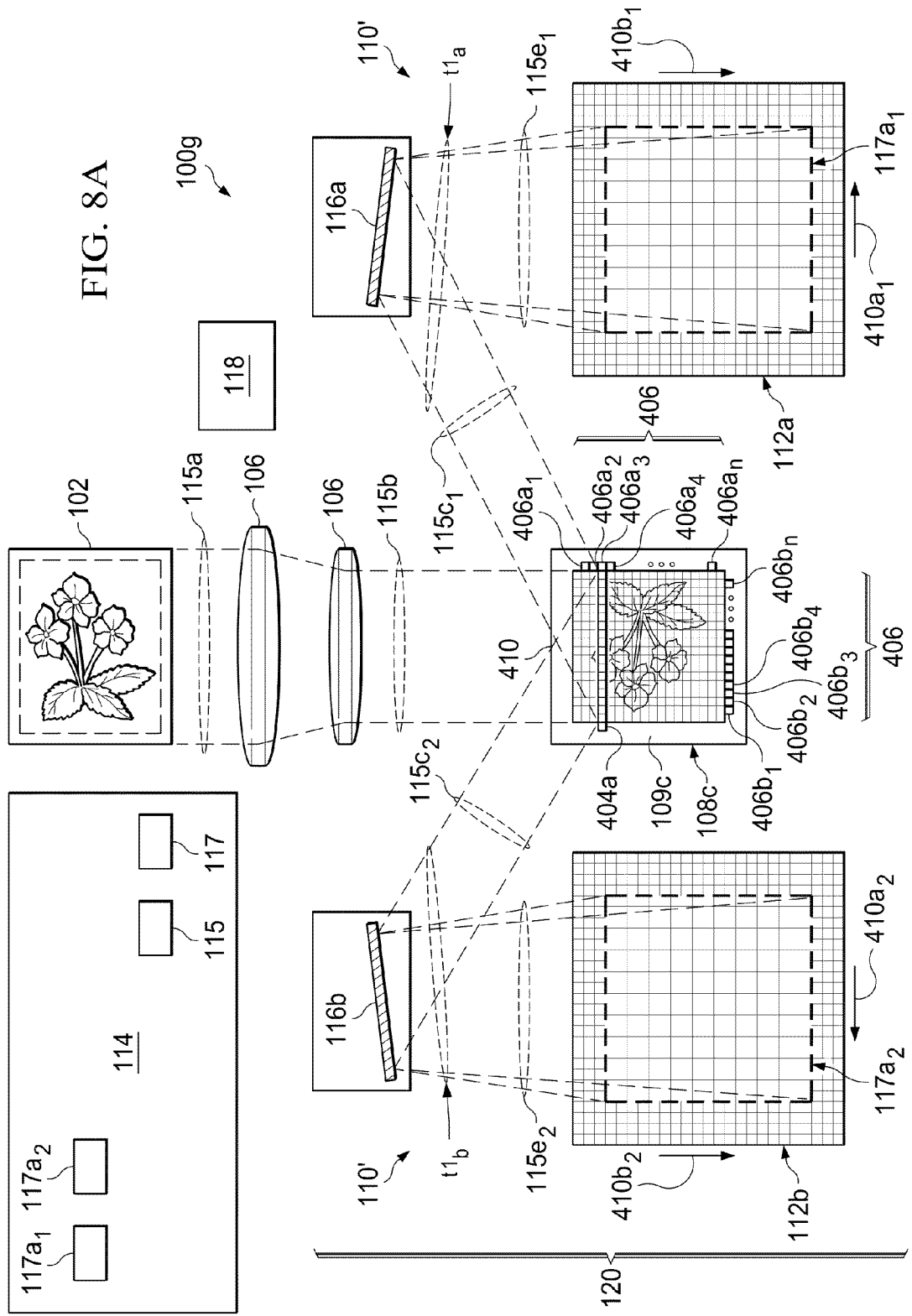
FIGS. 8A-8B are several diagrams illustrating an exemplary dual-channel hyperspectral imaging system which incorporates the scannable slit mechanism in accordance with another embodiment of the present invention.
Figure 8B:
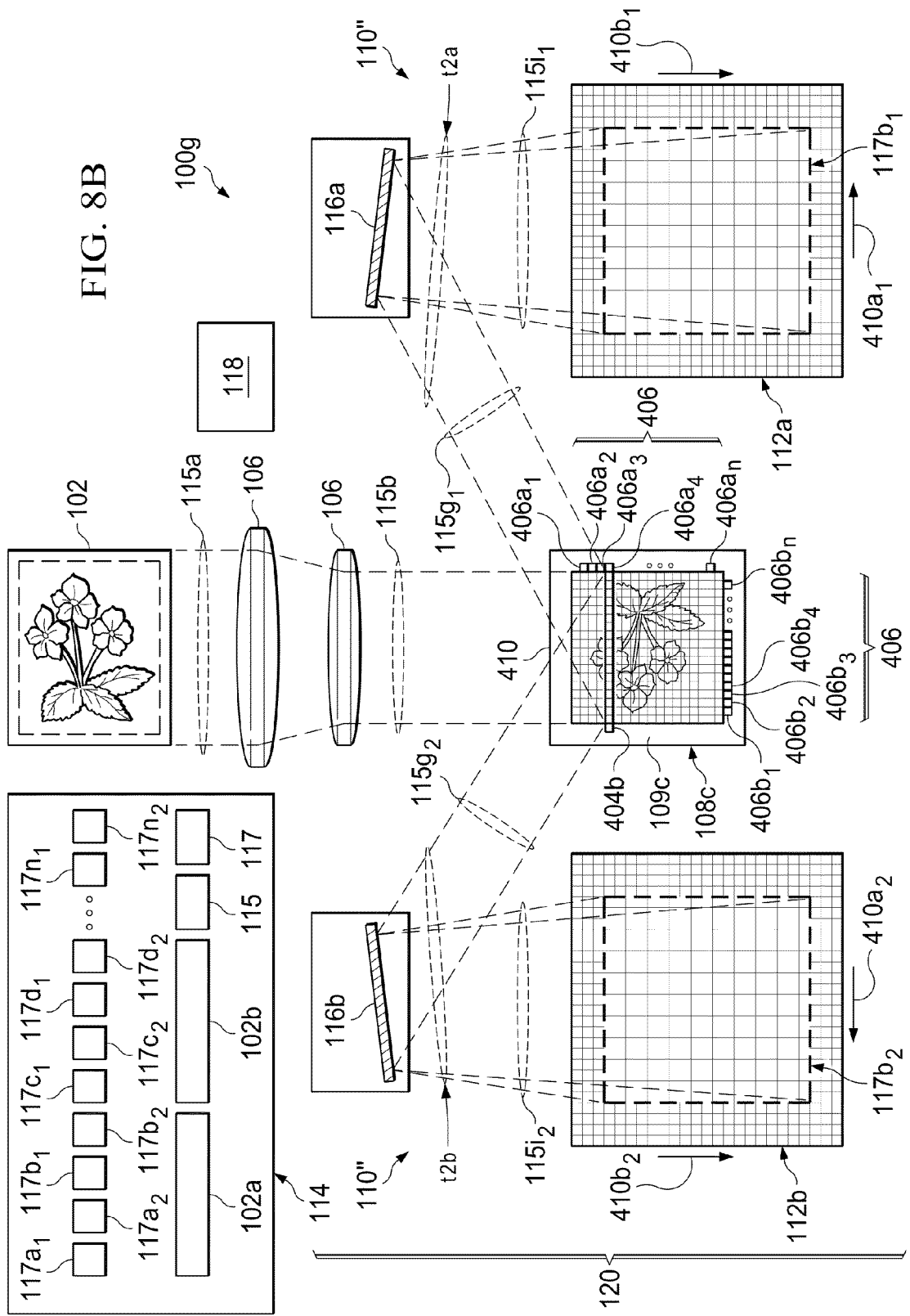

Referring to FIGS. 8A-8B, there are several diagrams illustrating an exemplary dual-channel hyperspectral imaging system 100g which incorporates the scannable slit mechanism 108 (e.g., the MEMs system 108a, the GLV system 108b, the DLP system 108c (shown), the LCD 108d, the rotating drum 108e, the rotating disk 1080 in accordance with another embodiment of the present invention. The dual-channel hyperspectral imaging system 100g includes the optics 106, the scannable slit mechanism 108c, the spectrometer 110' (diffraction gratings 116a and 116b), the two-dimensional image sensors 112a and 112b, the controller 114, the light dump 118, and the housing 120. It should be appreciated that the optics 106, the scannable slit mechanism 108c, the spectrometer 110' (diffraction gratings 116a and 116b), and the two-dimensional image sensors 112a and 112b would be positioned with respect to one another such that the light rays would be properly directed from one component to another component. However, to help explain the various features of the dual-channel hyperspectral imaging system 110g, the locations and orientations of the optics 106, the scannable slit mechanism 108c, the spectrometer 110' (diffraction gratings 116a and 116b), and the two-dimensional image sensors 112a and 112b have been changed. For instance, the scannable slit mechanism 108c has a surface 109c which is shown as facing the reader but in practice the surface 109c would be facing the major surfaces of the optics 106. Furthermore, the spectrometer 110' would be positioned and if needed have components (e.g., two mirrors 122) so the two diffraction gratings 116a and 116b can receive the one or more lines of light $115c_1$, $115c_2$, $115g_1$, and $115g_2$ from the scannable slit mechanism 108c. Plus, the spectrometer 110' if needed could have components (e.g., two mirrors 124) to receive the one or more diffracted lines of light from the diffraction gratings 116a and 116b and reflect the one or more diffracted lines of light $115e_1$, $115e_2$, $115i_1$, and $115i_2$ to the image sensors 112a and 112b. Also for clarity, the various well-known components of the DLP system 108c such as lenses, filters etc. . . . have not been described herein and only the components needed to explain the present disclosure have been described.

As shown in FIG. 8A, there is an example where the dual-channel hyperspectral imaging system 100g is positioned at the first time "t1a" and "t1b" such that the optics 106 receive light 115a associated with the remote object 104. The DLP system 108c has a surface 109c positioned to receive the light 115b from the optics 106. The surface 109c is positioned at an image plane of the optics 106. In addition, the surface 109c has an array of mirrors 406 including multiple rows of mirrors $406a_1$, $406a_2$ . . . $406a_n$ and multiple columns of mirrors $406b_1$, $406b_2$ . . . $406b_n$ formed on a semiconductor chip 410. The controller 114 interacts with the semiconductor chip 410 to have actuators (or the like) move any one or any number of the individual mirrors 406 to anyone of two on-positions to reflect light 115b from the optics 106 to the spectrometer 110'. The remaining mirrors 406 in the "off-position" would reflect the light 115b received thereon away from the spectrometer 110 and if used the light dump 118 can be positioned to receive this reflected light. For instance, the controller 114 can interact with the semiconductor chip 410 to activate (e.g., tilt) in one direction either one row (or a portion of one row) of the mirrors $406a_1$, $406a_2$ . . . $406a_n$ or one column (or a portion of one column) of the mirrors $406b_1$, $406b_2$ . . . $406b_n$ to form the first slit 404a.

In this example, the controller 114 interacts with the semiconductor chip 410 at the first time "t1a" to activate the row of mirrors $406a_3$ to be positioned in a first on-position to form the first slit 404a and reflect a first line of light $115c_1$ to the spectrometer 110' which is eventually directed to the diffraction grating 116a by way of, for example, a mirror (similar to mirror 122 shown in FIG. 1). The diffraction grating 116a generates diffracted light $115e_1$ which is eventually received by the two-dimensional image sensor 112a by way of, for example, another mirror (similar to mirror 124 shown in FIG. 1). The two-dimensional image sensor 112a generates a two-dimensional image $117a_1$ which includes one axis $410a_1$ representing the spatial information of the diffracted light $115e_1$ and another axis $410b_1$ representing the spectral information of the diffracted light $115e_1$. The controller 114 receives and stores the two-dimensional image $117a_1$.

The controller 114 then interacts with the semiconductor chip 410 at the first time "t1b" to re-position the row of mirrors $406a_3$ (first slit 404a) into the second on-position so they reflect a first line of light $115c_2$ to the spectrometer 110' which is eventually directed to the diffraction grating 116b by way of, for example, a mirror (similar to mirror 122 shown in FIG. 1). The diffraction grating 116b generates diffracted light $115e_2$ which is eventually received by the two-dimensional image sensor 112b by way of, for example, another mirror (similar to mirror 124 shown in FIG. 1). The two-dimensional image sensor 112b generates a two-dimensional image $117a_2$ which includes one axis $410a_2$ representing the spatial information of the diffracted light $115e_2$ and another axis $410b_2$ representing the spectral information of the diffracted light $115e_2$. The controller 114 receives and stores the two-dimensional image $117a_2$.

In FIG. 8B, the dual-channel hyperspectral imaging system 100g is positioned at the second time "t2a" and "t2b" such that the optics 106 receive light 115a associated with the remote object 104. In this example, the controller 114 interacts with the semiconductor chip 410 at the second time "t2a" to deactivate (move to off-position) the row of mirrors $406a_3$ and activate the row of mirrors $406a_4$ to be positioned in a first on-position to form the second slit 404b and reflect a first line of light $115g_1$ to the spectrometer 110' which is eventually directed to the diffraction grating 116a by way of, for example, a mirror (similar to mirror 122 shown in FIG. 1). The diffraction grating 116a generates diffracted light $115i_1$ which is eventually received by the two-dimensional image sensor 112a by way of, for example, another mirror (similar to mirror 124 shown in FIG. 1). The two-dimensional image sensor 112a generates a two-dimensional image $117b_1$ which includes one axis $410a_1$ representing the spatial information of the diffracted light $115i_1$ and another axis $410b_1$ representing the spectral information of the diffracted light $115i_1$. The controller 114 receives and stores the two-dimensional image $117b_1$.

The controller 114 then interacts with the semiconductor chip 410 at the second time "t2b" to re-position the row of mirrors $406a_4$ (second slit 404a) into the second on-position so they reflect a first line of light $115g_2$ to the spectrometer 110' which is eventually directed to the diffraction grating 116b by way of, for example, a mirror (similar to mirror 122 shown in FIG. 1). The diffraction grating 116b generates diffracted light $115i_2$ which is eventually received by the two-dimensional image sensor 112b by way of, for example, another mirror (similar to mirror 124 shown in FIG. 1). The two-dimensional image sensor 112b generates a two-dimensional image $117b_2$ which includes one axis $410a_2$ representing the spatial information of the diffracted light $115i_2$ and another axis $410b_2$ representing the spectral information of the diffracted light $115i_2$. The controller 114 receives and stores the two-dimensional image $117b_2$.

Thereafter, the controller 114 interacts with the DLP system 108c and the two-dimensional image sensors 112a and 112b in a similar manner to sequentially deactivate a row of mirrors $406b_4$, $406b_5$ . . . $406b_{n-1}$ and activate the adjacent row of mirrors $406b_5$, $406b_6$ . . . $406b_n$ into two different on-positions to obtain different two-dimensional images $117c_1$, $117c_2$, $117d_1$, $117d_2$ . . . $117n_1$, $117n_2$ associated with different lines of light from the remote object 104. The controller 114 combines the two-dimensional images $117a_1$, $117b_1$, $117c_1$ . . . $117n_1$ to provide one hyperspectral image 102a of an area of the remote object 104. Plus, the controller 114 combines the two-dimensional images $117a_2$, $117b_2$, $117c_2$ . . . $117n_2$ to provide one hyperspectral image 102b of an area of the remote object 104.

As can be appreciated, the dual-channel hyperspectral imaging system 100g allows for faster processing of the spectral data streams by using two diffraction gratings 116a and 116b and the two images sensors 112a and 112b when compared to the single-channel hyperspectral imaging system 100c. In this example, the two diffraction gratings 116a and 116b would each have different physical characteristics (e.g., grating periods, grating shapes) so as to operate at different wavelengths such that the diffraction grating 116a and resulting hyperspectral image 102a would be associated with infrared light (for example) and diffraction grating 116b and resulting hyperspectral image 102b would be associated with visible light (for example). If desired, the dual-channel hyperspectral imaging system 100g could allow for faster processing by using a multiple slit option described above with respect to FIGS. 2C-2D, 3C-3D, 4C-4D, 5C-5D, 6C-6D, and 7D-7D. For instance, the controller 114 could at the first time "t1a" and "t1b" sequentially activate multiple rows of mirrors $406a_3$ and $406a_{13}$ (for instance) through the two on-positions then at the second time "t2a" and "t2b" deactivate the rows of mirrors $406a_3$ and $406a_{13}$ and sequentially activate rows of mirrors $406a_4$ and $406a_{14}$ through the two on-positions etc. . . .

Alternatively, the diffraction grating 116a and 116b can have the same physical characteristics (e.g., grating periods, grating shapes) so as to operate at the same wavelength. If desired, the diffraction gratings 116a and 116b could be formed at the same time in the same monolithic bar which has a hole in the middle thereof for the initial light 115b being received by the scanable slit mechanism 108. In this case, the controller 114 could at the first time "t1" activate one row of mirrors $406a_3$ to direct a line of light to diffraction grating 116a and activate one row of mirrors $406a_4$ to direct a line of light to diffraction grating 116b. Then, the controller 114 could at the second time "t2" deactivate the row of mirrors $406a_3$ and activate the row of mirrors $406a_5$ to direct a line of light to diffraction grating 116a and deactive the row of mirrors $406a_4$ and activate the row of mirrors $406a_6$ to direct a line of light to diffraction grating 116b etc. . . . Moreover, the dual-channel hyperspectral imaging system 100g could allow for faster processing by using a multiple slit option as described above with respect to FIGS. 2C-2D, 3C-3D, 4C-4D, 5C-5D, 6C-6D, and 7C-7D. For instance, the controller 114 could at the first time "t1" activate multiple rows of mirrors $406a_3$ and $406a_{13}$ (for instance) to direct multiple lines of light to diffraction grating 116a and activate multiple rows of mirrors $406a_4$ and $406a_{14}$ (for instance) to direct multiple lines of light to diffraction grating 116b. Then, the controller 114 could at the second time "t2" deactivate multiple rows of mirrors $406a_3$ and $406a_{13}$, activate multiple rows of mirrors $406a_5$ and $406a_{15}$ (for instance) to direct multiple lines of light to diffraction grating 116a, deactivate multiple rows of mirrors $406a_4$ and $406a_{14}$, and activate multiple rows of mirrors $406a_6$ and $406a_{16}$ (for instance) to direct multiple lines of light to diffraction grating 116b etc. . . .

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims. It should also be noted that the reference to the "present disclosure" or "disclosure" used herein relates to exemplary embodiments and not necessarily to every embodiment that is encompassed by the appended claims.

The invention claimed is:

1. A hyperspectral imaging system for providing a hyperspectral image of an area of a remote object, the hyperspectral imaging system comprising:
   at least one optic configured to receive light associated with the remote object;
   a scannable slit mechanism comprising a surface configured to receive the light from the at least one optic, and the surface further positioned at an image plane of the at least one optic;
   the scannable slit mechanism configured to activate at a first time multiple first slits located in multiple positions on the surface, where the activated multiple first slits provide multiple first lines of the light;
   a spectrometer comprising at least a diffraction grating configured to receive the multiple first lines of the light and provide multiple first diffracted lights;
   a two-dimensional image sensor configured to receive the multiple first diffracted lights and provide a two dimensional image of the multiple first diffracted lights, and wherein the multiple first slits are separated from one another by a predetermined spectral band so that the multiple first diffracted lights are separated from one another in the two dimensional image of the multiple first diffracted lights; and
   wherein the scannable slit mechanism comprises a drum with multiple slits formed therein and an actuator that rotates the drum.

2. The hyperspectral imaging system of claim 1, further comprising a light dump configured to receive the light from the remote object which is not provided by the scannable slit mechanism to the diffraction grating.

3. The hyperspectral imaging system of claim 1, wherein at the first time the actuator positions the drum such that the multiple slits formed therein are the activated multiple first slits.

4. The hyperspectral imaging system of claim 1, wherein:
   the spectrometer further comprises at least a second diffraction grating;
   the scannable slit mechanism is further configured during the first time to re-position the multiple first slits to provide the multiple first lines of the light which are to be received by the second diffraction grating rather than the first diffraction grating, where the second diffraction grating provides multiple first diffracted lights; and
   a second two-dimensional image sensor is configured to receive the multiple first diffracted lights provided by the second diffraction grating and to provide a second two dimensional image of the multiple first diffracted lights provided by the second diffraction grating.

5. The hyperspectral imaging system of claim 4, wherein the first diffraction grating and the second diffraction grating each have different physical characteristics so as to operate at different wavelengths.

6. The hyperspectral imaging system of claim 4, wherein the first diffraction grating and the second diffraction grating each have same physical characteristics so as to operate at same wavelength.

7. The hyperspectral imaging system of claim 1, wherein:
   the scannable slit mechanism is further configured at a second time to deactivate the multiple first slits and activate multiple second slits located in multiple different positions on the surface when compared to the multiple positions of the deactivated multiple first slits, where the activated multiple second slits provide multiple second lines of the light;
   the diffraction grating is configured to receive the multiple second lines of the light and provide multiple second diffracted lights; and
   the two-dimensional image sensor is configured to receive the multiple second diffracted lights and provide a two dimensional image of the multiple second diffracted lights, and wherein the multiple second slits are separated from one another by a predetermined spectral band so that the multiple second diffracted lights are separated from one another in the two dimensional image of the multiple second diffracted lights.

8. The hyperspectral imaging system of claim 7, further comprising a controller configured to combine the two dimensional images of the multiple first diffracted lights and the multiple second diffracted lights to provide the hyperspectral image of the area of the remote object.

9. The hyperspectral imaging system of claim 7, further comprising a controller configured to control the scannable slit mechanism and the two-dimensional image sensor to synchronize at the first time the activation of the multiple first slits and the imaging of the multiple first diffracted lights, and then synchronize at the second time the deactivation of the multiple first slits, the activation of the multiple second slits, and the imaging of the multiple second diffracted lights.

10. A method for providing a hyperspectral image of an area of a remote object, the method comprising the steps of:
providing a hyperspectral imaging system comprising:
at least one optic configured to receive light associated with the remote object;
a scannable slit mechanism comprising a surface configured to receive the light from the at least one optic, and the surface further positioned at an image plane of the at least one optic;
the scannable slit mechanism is configured to activate at a first time multiple first slits located in at least one position on the surface, where the activated multiple first slits provide multiple first lines of the light;
a spectrometer comprising at least a diffraction grating configured to receive the multiple first lines of the light and provide multiple first diffracted lights;
a two-dimensional image sensor configured to receive the multiple first diffracted lights and provide a two dimensional image of the multiple first diffracted lights, and wherein the multiple first slits are separated from one another by a predetermined spectral band so that the multiple first diffracted lights are separated from one another in the two dimensional image of the multiple first diffracted lights; and
wherein the scannable slit mechanism comprises a drum with multiple slits formed therein and an actuator that rotates the drum.

11. The method of claim 10, wherein:
the spectrometer further comprises at least a second diffraction grating:
the scannable slit mechanism is further configured during the first time to re-position the multiple first slits to provide the multiple first lines of the light which is are to be received by the second diffraction grating rather than the first diffraction grating, where the second diffraction grating provides multiple first diffracted lights; and
a second two-dimensional image sensor configured to receive the multiple first diffracted lights provided by the second diffraction grating and to provide a second two dimensional image of the multiple first diffracted lights provided by the second diffraction grating.

12. The method of claim 11, wherein the first diffraction grating and the second diffraction grating each have different physical characteristics so as to operate at different wavelengths.

13. The method of claim 11, wherein the first diffraction grating and the second diffraction grating each have same physical characteristics so as to operate at same wavelength.

14. The method of claim 10, wherein:
the scannable slit mechanism is further configured at a second time to deactivate the multiple first slits and activate multiple second slits located in multiple different positions on the surface when compared to the multiple positions of the deactivated multiple first slits, where the activated multiple second slits provide multiple second lines of the light;
the diffraction grating is configured to receive the multiple second lines of the light and provide multiple second diffracted lights; and
the two-dimensional image sensor is configured to receive the multiple second diffracted lights and provide a two dimensional image of the multiple second diffracted lights, and wherein the multiple second slits are separated from one another by a predetermined spectral band so that the multiple second diffracted lights are separated from one another in the two dimensional image of the multiple second diffracted lights.

15. The method of claim 14, further comprising a step of combining the two dimensional images of the multiple first diffracted lights and the multiple second diffracted lights to provide the hyperspectral image of the area of the remote object.

16. The method of claim 14, further comprising a step of controlling the scannable slit mechanism and the two-dimensional image sensor to synchronize at the first time the activation of the multiple first slits and the imaging of the multiple first diffracted lights, and then synchronize at the second time the deactivation of the multiple first slits, the activation of the multiple second slits, and the imaging of the multiple second diffracted lights.

17. A hyperspectral imaging system for providing a hyperspectral image of an area of a remote object, the hyperspectral imaging system comprising:
at least one optic configured to receive light associated with the remote object;
a scannable slit mechanism comprising a surface configured to receive the light from the at least one optic, and the surface further positioned at an image plane of the at least one optic;
the scannable slit mechanism is configured to activate at a first time at least one first slit located in at least one position on the surface, where the activated at least one first slit provides at least one first line of the light;
a spectrometer comprising at least a diffraction grating configured to receive the at least one first line of the light and provide at least one first diffracted light;
a two-dimensional image sensor configured to receive the at least one first diffracted light and provide a two dimensional image of the at least one first diffracted light;
the scannable slit mechanism is further configured at a second time to deactivate the at least one first slit and activate at least one second slit located in at least one different position on the surface when compared to the at least one position of the deactivated at least one first slit, where the activated at least one second slit provides at least one second line of the light;
the diffraction grating is configured to receive the at least one second line of the light and provide at least one second diffracted light;
the two-dimensional image sensor is configured to receive the at least one second diffracted light and provide a two dimensional image of the at least one second diffracted light;
wherein the scannable slit mechanism comprises a drum with multiple slits formed therein and an actuator that rotates the drum.

* * * * *